(12) United States Patent
Westland et al.

(10) Patent No.: US 12,079,747 B1
(45) Date of Patent: Sep. 3, 2024

(54) DETERMINING EMPLOYEE SHIFT CHANGES

(71) Applicant: Block, Inc., Oakland, CA (US)

(72) Inventors: Dina Westland, San Francisco, CA (US); Amir Nathoo, San Francisco, CA (US); Yunus Sasmaz, San Francisco, CA (US); Michael Kim, San Francisco, CA (US); Claudia J. Ng, San Bruno, CA (US); Scott Silver, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/094,497

(22) Filed: Jan. 9, 2023

Related U.S. Application Data

(63) Continuation of application No. 16/742,649, filed on Jan. 14, 2020, now Pat. No. 11,551,168, which is a continuation of application No. 14/527,153, filed on Oct. 29, 2014, now Pat. No. 10,535,024.

(51) Int. Cl.
*G06Q 10/06* (2023.01)
*G06Q 10/0631* (2023.01)

(52) U.S. Cl.
CPC .......................... *G06Q 10/063116* (2013.01)

(58) Field of Classification Search
CPC .......................................... G06Q 10/00–90/00
See application file for complete search history.

(56) References Cited

U.S. PATENT DOCUMENTS

| | | |
|---|---|---|
| 5,615,138 A | 3/1997 | Tanaka et al. |
| 6,415,270 B1 | 7/2002 | Rackson et al. |
| 6,587,831 B1 | 7/2003 | O'Brien |
| 7,272,569 B1 | 9/2007 | Walker et al. |
| 8,005,697 B1 | 8/2011 | Cohen et al. |
| 8,401,884 B1 | 3/2013 | Kinney |
| 8,744,889 B1 | 6/2014 | Foss et al. |
| 9,378,476 B1 | 6/2016 | Schwartz et al. |
| 9,595,016 B1 | 3/2017 | Schwartz et al. |
| 10,535,024 B1 | 1/2020 | Westland et al. |

(Continued)

OTHER PUBLICATIONS

Chiaramonte, et al., "An agent-based nurse rostering system under minimal staffing conditions", Int. J. Production Economics 114, 2008, 697-713.

(Continued)

*Primary Examiner* — Arif Ullah
(74) *Attorney, Agent, or Firm* — Lee & Hayes, P.C.

(57) ABSTRACT

In some examples, a service provider may determine from a shift schedule that a first employee is scheduled to work a particular shift at a business within a threshold period of time. The service provider may determine, based on a location of a first mobile device of the first employee, that the first employee is unlikely to arrive at the business in time for the start of the particular shift. In response, the service provider may find a replacement employee to fill the shift of the first employee. For instance, the service provider may send the communication to a second mobile device associated with a second employee that is determined to be within a threshold distance of the business. Alternatively, if the service provider determines that the business is overstaffed on a particular day, the service provider may offer a selected employee an incentive to depart work early.

20 Claims, 12 Drawing Sheets

(56) References Cited

U.S. PATENT DOCUMENTS

| | | |
|---|---|---|
| 10,572,844 B1 | 2/2020 | Westland et al. |
| 11,551,168 B1 | 1/2023 | Westland et al. |
| 2002/0040313 A1 | 4/2002 | Hunter et al. |
| 2002/0111895 A1 | 8/2002 | Blair |
| 2003/0018509 A1 | 1/2003 | Ossip et al. |
| 2003/0093706 A1 | 5/2003 | Cronin et al. |
| 2003/0097047 A1 | 5/2003 | Woltermann et al. |
| 2005/0096962 A1 | 5/2005 | Narasimhan et al. |
| 2006/0224477 A1 | 10/2006 | Garcia et al. |
| 2007/0021999 A1 | 1/2007 | Whalen et al. |
| 2007/0100677 A1 | 5/2007 | Boss et al. |
| 2008/0059274 A1 | 3/2008 | Holliday |
| 2008/0059277 A1 | 3/2008 | Medina et al. |
| 2008/0319822 A1 | 12/2008 | LaJoie et al. |
| 2009/0254404 A1 | 10/2009 | Eggenberger et al. |
| 2009/0265205 A1 | 10/2009 | Stinchcombe et al. |
| 2009/0268022 A1 | 10/2009 | Omi |
| 2010/0137748 A1 | 6/2010 | Sone et al. |
| 2010/0228584 A1 | 9/2010 | Nash |
| 2011/0238476 A1 | 9/2011 | Carr et al. |
| 2012/0092492 A1 | 4/2012 | Carbonell et al. |
| 2012/0323626 A1 | 12/2012 | Beauregard et al. |
| 2013/0090968 A1 | 4/2013 | Borza |
| 2013/0218770 A1* | 8/2013 | Prather .............. G06Q 20/0655 705/44 |
| 2014/0089027 A1 | 3/2014 | Brown |
| 2014/0147018 A1 | 5/2014 | Argue et al. |
| 2014/0172615 A1 | 6/2014 | Major |
| 2014/0180826 A1 | 6/2014 | Boal |
| 2014/0229224 A1 | 8/2014 | Appel et al. |
| 2014/0304158 A1 | 10/2014 | Basu et al. |
| 2014/0372161 A1 | 12/2014 | Ulrich et al. |
| 2015/0095171 A1 | 4/2015 | Morgan et al. |
| 2015/0127394 A1 | 5/2015 | Hogan et al. |
| 2015/0127401 A1 | 5/2015 | Hogg et al. |
| 2015/0169834 A1 | 6/2015 | Nishimura et al. |
| 2015/0186989 A1 | 7/2015 | Kneen et al. |
| 2015/0193263 A1 | 7/2015 | Nayyar et al. |
| 2015/0208043 A1 | 7/2015 | Lee et al. |
| 2015/0262158 A1 | 9/2015 | Rasband et al. |
| 2015/0317593 A1 | 11/2015 | Gudowicz et al. |
| 2015/0317681 A1 | 11/2015 | Zamer et al. |
| 2016/0012379 A1 | 1/2016 | Iwai |
| 2016/0162910 A1 | 6/2016 | Pradhan et al. |
| 2016/0176409 A1 | 6/2016 | Kirsch et al. |
| 2016/0247121 A1 | 8/2016 | Simpson et al. |
| 2017/0083850 A1 | 3/2017 | Crow et al. |
| 2017/0103374 A1 | 4/2017 | Bhattacharjee et al. |
| 2017/0109844 A1 | 4/2017 | Brown |
| 2017/0172520 A1 | 6/2017 | Kannan et al. |

OTHER PUBLICATIONS

De Grano, et al., "Accomodating individual preferences in nurse scheduling via auctions and optimizatio", Health Care Manage Sci, (2009), 12:228-242.

Office Action for U.S. Appl. No. 14/527,153, mailed on Apr. 6, 2017, Westland et a., "Determining Employee Shift Changes", 42 pages.

\* cited by examiner

SHIFTS AVAILABLE FOR WEEK OF NOV. 1-7

| | MON. | TUES. | WED. | THUR. | FRI. | SAT. EARLY | SAT. LATE | SUN. EARLY | SUN. LATE |
|---|---|---|---|---|---|---|---|---|---|
| CHEF1 | 4-10 | 4-10 | 4-10 | 4-10 | 4-10 | 11-6 | 6-12 | 11-5 | 5-10 |
| CHEF2 | N/A | N/A | N/A | N/A | 6-12 | N/A | 5-11 | N/A | 4-10 |
| BARTENDER | 4-10 | 4-10 | 4-10 | 4-10 | 4-12 | 11-7 | 7-12 | 11-5 | 5-10 |
| SERVER1 | 4-10 | 4-10 | 4-10 | 4-10 | 4-12 | 11-7 | 7-12 | 11-5 | 5-10 |
| SERVER2 | 4-10 | 4-10 | 4-10 | 4-10 | 4-12 | 11-7 | 7-12 | 11-5 | 5-10 |
| SERVER3 | N/A | N/A | N/A | N/A | 4-10 | N/A | 4-10 | N/A | 4-10 |
| SERVER4 | 4-10 | 4-10 | 4-10 | 4-10 | 4-12 | 11-7 | 7-12 | 11-5 | 5-10 |
| KITCHEN1 | 4-10 | 4-10 | 4-10 | 4-10 | 7-12 | 11-7 | 7-12 | 11-5 | 5-10 |
| KITCHEN2 | N/A | N/A | N/A | N/A | 4-12 | N/A | 7-12 | N/A | 5-10 |
| KITCHEN3 | 4-10 | 4-10 | 4-10 | 4-10 | 4-12 | 11-7 | 7-12 | 11-5 | N/A |
| HOST/HOSTESS1 | 4-10 | 4-10 | 4-10 | 4-10 | 4-12 | 11-7 | 7-12 | 11-5 | 5-10 |

ASSIGN SHIFTS 234

VIEW SHIFT HISTORY 236

SELECT DIFFERENT WEEK 238

EMPLOYEE INFORMATION 240

SHIFT SCHEDULE FOR WEEK OF NOV. 1-7

| | MON. | TUES. | WED. | THUR. | FRI. | SAT. EARLY | SAT. LATE | SUN. EARLY | SUN. LATE |
|---|---|---|---|---|---|---|---|---|---|
| CHEF1 | KELLY 4-10 | JOE 4-10 | | | | | KELLY 6-11 | LIN 11-5 | KELLY 5-10 |
| CHEF2 | N/A | N/A | | | | | LIN 5-11 | N/A | JOE 4-10 |
| BARTENDER | SUE 4-10 | RICK 4-10 | | | | | RICK 7-11 | SUE 11-5 | RICK 5-10 |
| SERVER1 | INCENTIVE 4-10 | SAM 4-10 | | | | | BID 6-11 | SAM 11-5 | PAT 5-10 |
| SERVER2 | INCENTIVE 4-10 | RILEY 4-10 | | | | | BID 6-11 | MAX 11-5 | GEORGE 5-10 |
| SERVER3 | INCENTIVE 4-10 | MICKIE 4-10 | | | | | BID 6-11 | CHRIS 11-5 | FRAN 5-10 |
| SERVER4 | N/A | N/A | | | | | BID 4-10 | N/A | N/A |
| KITCHEN1 | MAX 4-10 | MAX 4-10 | MAX 4-10 | MAX 4-10 | JOHN 4-12 | JESS 11-7 | JOHN 7-12 | JESS 11-5 | LESLIE 5-10 |
| KITCHEN2 | LESLIE 4-10 | LESLIE 4-10 | LESLIE 4-10 | LOU 4-10 | LOU 4-11 | LOU 11-7 | LESLIE 7-11 | ALEX 11-5 | LOU 5-10 |
| KITCHEN3 | N/A | N/A | | N/A | ALEX 7-11 | N/A | ALEX 7-11 | N/A | N/A |
| HOST/HOSTESS1 | DANA 4-10 | DANA 4-10 | DANA 4-10 | DANA 4-10 | DANA 4-11 | VAL 11-7 | ASH 7-11 | VAL 11-5 | ASH 5-10 |

PLACE BID TO BE ASSIGNED THIS SHIFT:
- 98% OF CURRENT WAGE
- 96% OF CURRENT WAGE
- 94% OF CURRENT WAGE
- 92% OF CURRENT WAGE
- 90% OF CURRENT WAGE
- PLACE OTHER BID

SEND SWAP REQUEST 410 | VIEW SHIFT HISTORY 412 | SELECT DIFFERENT WEEK 414

US 12,079,747 B1

DETERMINING EMPLOYEE SHIFT CHANGES

CROSS REFERENCE TO RELATED APPLICATIONS

This application is a continuation of, and claims priority to U.S. patent application Ser. No. 16/742,649, filed Jan. 14, 2020, entitled "DETERMINING EMPLOYEE SHIFT CHANGES", and U.S. patent application Ser. No. 14/527,153, filed on Oct. 29, 2014, entitled "Determining Employee Shift Changes", the contents of which are herein incorporated by reference.

BACKGROUND

In many types of jobs, employers typically schedule employees to work in shifts. However, scheduling shifts for a number of employees can be a challenging and time-consuming task for an employer. For example, some employees may not be available to work during certain time slots and/or may prefer to work particular shifts, rather than other shifts. Further, some employees may have limited skill sets or may otherwise only be able to be scheduled to work when certain other employees are scheduled to work. Additionally, if an employee does not show up for a scheduled shift, the employer may be left scrambling to find a replacement employee to take over the shift.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example graphic user interface (GUI) for shift management according to some implementations.

FIG. 5 illustrates an example GUI for shift management by an employee according to some implementations.

DETAILED DESCRIPTION

Figure 1:
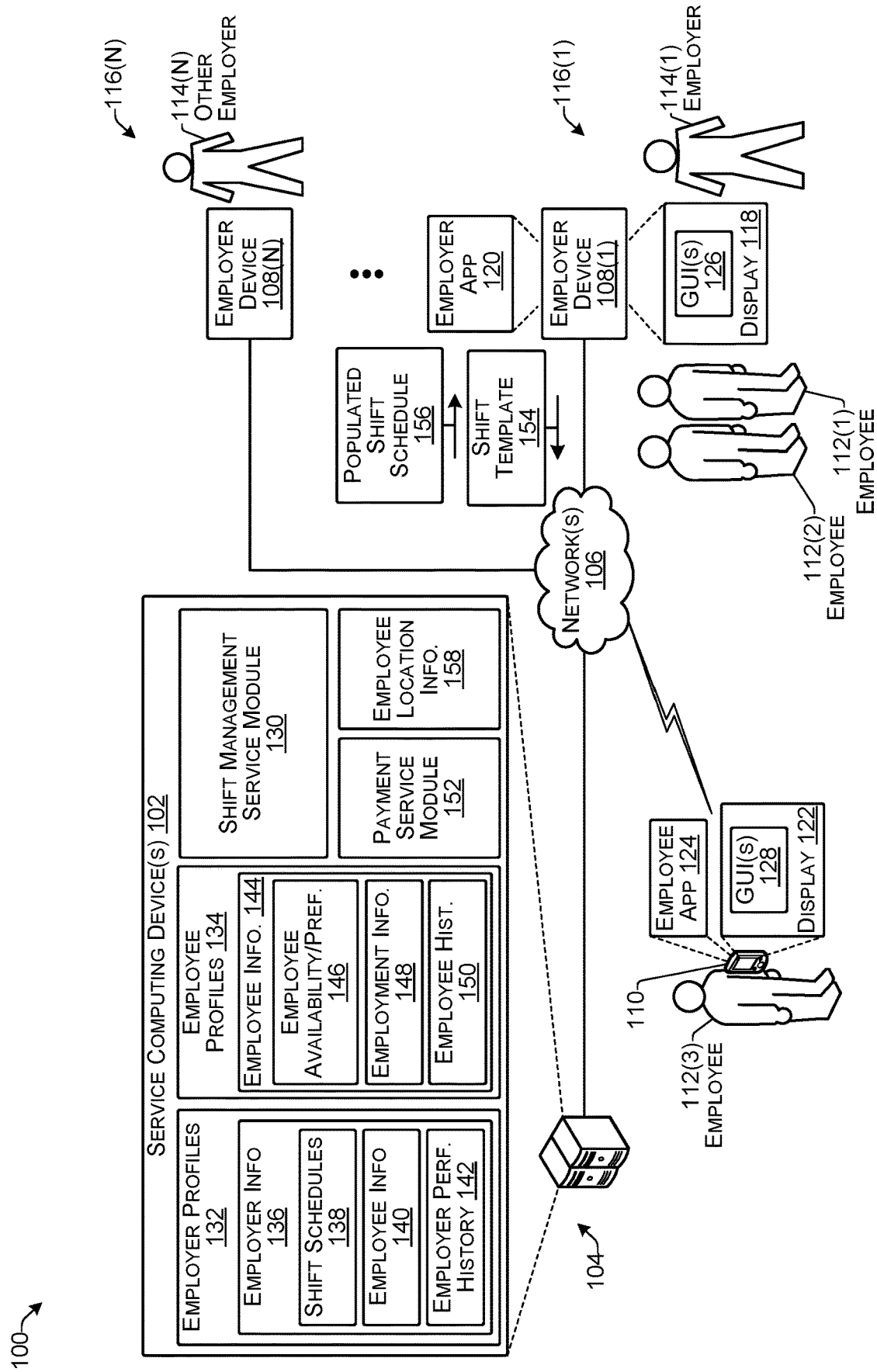
FIG. 1 illustrates an example environment for a shift management service according to some implementations.

Some implementations described herein include techniques and arrangements for providing employers and employees with a shift management tool for scheduling employee shifts. For example, the shift management tool may include a graphical user interface (GUI) that automatically schedules a plurality of shifts for a plurality of employees, while minimizing the amount of employer oversight for the shift scheduling process. Additionally, the shift management tool may include built-in intelligence that is able to recommend and/or schedule particular employees for particular shifts, such as based on past shift requirements, past shift performance, employee availability, employee preferences, employee performance ratings, employee compatibility with other employees, employee language capabilities, employee skill sets, and employee compensation. A service provider may provide the shift management tool to the employer either as a standalone service, or in connection with a payment processing service, a payroll service, and/or various other services.

The shift management tool may further include one or more GUIs usable by an employee, such as for specifying preferences for particular shifts and/or specifying particular shifts for which the employee is unavailable. Further, employees may be provided an opportunity to bid on particular shifts that are preferred by the employees, such as by bidding to work for lower compensation for particular shifts. For instance, suppose that a Saturday night shift at a particular restaurant typically provides substantially greater money in gratuities to employees than any other night of the week. The shift management tool may provide a graphic user interface that enables the employees to bid on working the Saturday night shift, such as bidding to receive a lower hourly wage during the Saturday night shift in return for being scheduled for the Saturday night shift.

On the other hand, for shifts that may typically be less lucrative for employees, such as a Monday or Tuesday night shift, the employer may use the GUI to offer employees greater compensation or other incentive to work that shift. For instance, the employer may start by offering a 20% increase in hourly pay during the shift to employees that volunteer to work the particular shift. If no employees accept the offered incentive, the employer may progressively increase the offered incentive until the shift has been filled. Alternatively, the employer may receive bids from the employees for an amount of compensation the employees are requesting to receive for working the undesirable shift.

In addition, the service provider may receive shift information, employee pay information, and employer income information, and may provide feedback to particular employers regarding the performance of particular employees during particular shifts, as well as feedback on the performance of the employer's business for each shift. As one example, the service provider may take into consideration performance across a large number of employers in a particular industry for particular shifts. The service provider may further take into consideration the time of day, the day of the week, the time of year, geographic location, special events, and so forth, for determining the performance of particular employees of a particular merchant during particular shifts and during times when particular other employees are also working.

The service provider may provide an application to the employer that may include at least a portion of the shift management tool. In some cases, the application may further provide point-of-sale (POS) functionality to enable the employer and/or the employees to conduct POS transactions with customers at a store, restaurant, or other POS location associated with the employer. As one example, the employer may access the GUI of the shift management tool on an employer device that also serves as a merchant device capable of processing POS transactions.

The employer may use the GUI on the employer device to initiate scheduling of shifts for the employees. In response, the shift management tool may send communications to the employees regarding the proposed shifts to be scheduled for one or more upcoming time periods. The employees may reply with availability information, preferences for preferred shifts, preferences for other employees with whom they would like to work, and so forth. The shift management tool may then generate a preliminary shift schedule and provide this to the employer. The employer may approve the preliminary shift schedule and authorize the shift management tool to provide the preliminary shift schedule to the employees. The employees may then be able use a GUI provided by the shift management tool to bid on particular shifts, determine whether to accept less desirable shifts for which an incentive is offered, swap shifts with other employees, and so forth. In some cases, an employee may use the same merchant device as the employer for setting preferences, selecting shifts, etc. In other cases, the employee may use his or her own computing device, such as by using a browser interface or a designated application on the employee device.

The shift management tool may automatically identify particular shifts that may be difficult to fill, and may propose that the employer offer an incentive for filling particular shifts. Additionally, the shift management tool may identify particular shifts that are popular, such as based on expressed employee preferences, how quickly the shifts have been filled in the past compared with other shifts offered by the employer, and the like. The shift management tool may recommend that these shifts be left open for bidding rather than being filled automatically.

In some examples, employees may be provided an incentive to be on call for certain shifts, such as by agreeing to be on call and allowing the shift management service to track the location of the employee during the shift for which the employee is on call. For example, if the shift management service or the employer determines that the employer's business is currently experiencing an unexpected surge in customer business, the shift management service may determine a location of the nearest employee that is currently on call, and may send a communication to that employee to request that the employee come in to work to help handle the unexpected increase in business at the employer's establishment.

In addition, the shift management service may determine when an employee will be late or has not shown up to work for a scheduled shift, such as based on location information received from the employee's mobile device. In response, the shift management service may automatically contact a replacement employee to fill the position of the employee that is absent. For instance, the shift management service may identify an employee that is on call and that is near to the employer's place of business, and may send an electronic communication to the on-call employee to request that the employee come in to work. Alternatively, if no employees are on call, the shift management service may identify an employee that is not currently scheduled for a shift and that is within a threshold distance of the place of business, and may send a communication to the employee to determine whether the employee is willing to fill the shift for the absent employee.

For discussion purposes, some example implementations are described in the environment of a service provider that provides a shift management service, including a shift management tool, to businesses, such as merchants. However, implementations herein are not limited to the particular examples described, and may be extended to other types of businesses, other types of employees, other usage environments, other types of user interfaces, other system architectures, and so forth, as will be apparent to those of skill in the art in light of the disclosure herein.

FIG. 1 illustrates an example environment 100 for a shift management service according to some implementations. The environment 100 includes one or more service computing devices 102 associated with a service provider 104 to provide the shift management service. In some examples, the service provider 104 may be any business, enterprise, or other entity that offers, sells, supplies or otherwise enables the shift management service and shift management tools described herein. The service computing device 102 may be able to communicate over one or more networks 106 with one or more employer devices 108 and one or more employee devices 110.

The one or more networks 106 can include any appropriate network, including a wide area network, such as the Internet: a local area network, such as an intranet: a wireless network, such as a cellular network, a local wireless network, such as Wi-Fi and/or close-range wireless communications, such as BLUETOOTH® and BLUETOOTH® low energy: a wired network: or any other communication network, or any combination thereof. Accordingly, the one or more networks 106 may include both wired and/or wireless communication technologies, including Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Each employee device 110 may be associated with a respective employee 112, and each employer device 108(1), . . . , 108(N) may be associated with a respective employer 114(1), . . . , 114(N). Further, the employer device 108 may also be associated with a particular geographic location, a place of business, establishment, etc., that serves as a respective point-of-sale (POS) location 116(1), . . . , 116(N) for the respective employer 114(1), . . . , 114(N). The employer device 108 may be a computing device that includes a display 118 and an instance of an employer application 120 that executes on each respective employer device 108(1), . . . , 108(N). In some examples, the employer application 120 and associated hardware (e.g., card reader, barcode scanner, as discussed below) may specifically configure the employer device 108 as a merchant device able to provide POS functionality to enable the employer 114 (or the employees 112) to accept payments at the POS location 116. For example, the employer 114 may use the employer device 108 to accept payments at the POS location 116 from one or more buyers (not shown) using a variety of payment instruments, such as payment cards, cash, checks, etc., as well as electronic payments through a mobile device. In other examples, the employer device 108 may be a computing device that is separate from a POS device at the POS location 116.

In some instances, the employer application 120 enables the employer to specify a preliminary shift schedule as a template for scheduling a plurality of employees for a plurality of shifts for a particular time duration, such as for a day, a week, a month, etc. A shift, as used herein, may include a period of time that an employee is scheduled to work for a particular employer on a particular day. For instance, the employer may typically establish the shifts for each day based on past experience and/or based on an estimate of the number of customers or the number of transactions that will be expected at the employer's business at any particular time during the day. The shifts may further be established by taking into account laws regarding lengths of time that employees are permitted to work, whether employees are full-time or part-time employees, and so forth. In some cases, as discussed additionally below, the shift management service may recommend a number of shifts for the employer to schedule, such as based on past shift history of the employer, past profitability of the employer on particular days or during particular shift periods, or the like.

In some examples, the employers 114(1)-114(N) may be merchants that offer various types of goods and/or services, referred to herein as items. The examples herein are not limited to any particular types of merchants, items or businesses. Thus, the employers 114 may include any business or other entity engaged in the offering of items for acquisition by buyers in exchange for compensation received from the buyers. Buyers may include customers or potential customers of a merchant/employer.

As mentioned above, some of the employees 112 may be associated with respective employee devices 110, which may include an associated display 122. In some instances, the employee devices 110 may be mobile devices, such as smart phones, tablet computers, wearable computing devices, or the like, as further enumerated elsewhere herein. In other cases, the employee devices 110 may be semi-stationary or stationary computing devices such as laptop computers, desktop computers, or the like.

An employee application 124 may be installed on at least some of the employee devices 110. The employee application 124 may enable the employee to view the shifts for which the employee is scheduled to work. In addition, the employee application 124 may enable the employee to provide and/or access employee information related to shift management, such as shift preferences, shifts for which the employee is unavailable, as well as other information, as discussed additionally below. In some examples, the employee application 124 may be a browser, while in other examples, the employee application 124 may be a more specialized application, such as a mobile device application provided by the service provider.

In the illustrated example, a first employee 112(1) and a second employee 112(2) may access one or more GUI(s) 126 presented by the employer application 120 on the employer device 108(1) for interacting with the shift management service. Additionally, a third employee 112(3) may access one or more GUI(s) 128 presented by the employee application 124 on the employee device 110 for interacting with the shift management service. Accordingly, employees 112 may have the option of interacting with the shift management service by using the GUI(s) 126 and/or 128 as a shift management tool through at least one of the employer device 108 or the employee device 110, respectively.

The service computing device 102 may include a shift management service module 130 that may interact with the employer device 108 and/or the employee device 110 to provide the shift management service. For example, the shift management service module 130 may access and/or maintain one or more employer profiles 132 and one or more employee profiles 134. When the employer 114 signs up for the shift management service or other services offered by the service provider 104, the employer 114 may create an employer profile 132 that includes employer information 136. For instance, the employer information 136 may include general information about the respective employer, such as the location of the employer's business, the type of business, items offered by the employer's business, and so forth.

In addition, for use by the shift management service, the employer information 136 may include one or more shift schedules 138, employee information 140, and an employer performance history 142. For example, the shift schedules 138 may be schedules that have been created for the employer based on input from the employer, as well as based on input from the employees of the employer. Further, the employee information 140 may identify which employees are associated with a particular employer, and the service computing device 102 may maintain an employee profile 134 associated with each employee 112. Additionally, the employer performance history 142 may include shift schedules that have been used in the past by the particular employer, which particular employees worked which particular shifts, as well as the performance results of the shift, which may include employee hours worked during particular shifts, gratuities earned by each employee, revenue taken in by the employer for particular shifts, or other profitability information corresponding to particular shifts, and so forth.

Further, each employee 112 may create an employee profile 134 that may be maintained by the service provider 104. The employee 112 can create the employee profile 134, for example, by interacting with the employee application 124 or the employer application 120. Thus, the service computing device 102 may receive employee information 144, and may save the employee information 144 in the corresponding employee profile 134. For instance, the employee information 144 may include employee availability and preference information 146, which may indicate shifts for which the employee is not available, and/or shifts that the employee would for to work. In addition, the employee information 144 may include appointment information 148, which may indicate current or past employers of the employee. For example, the employee may have multiple employers at the same time, and the shift management service may take into account the scheduling of the employee at each employer when scheduling the employee for individual shifts at the multiple employers.

Furthermore, in some cases, the employee information 144 may include an employee history 150. For example, the employee history 150 may provide information regarding the employee's attendance record at a past employer, performance history at a past employer, and so forth. Additionally, the employee information 144 in the employee profile 134 may also include other employee information (not shown) such as employee contact information, employee demographic data, employee payroll information (such as in the case that the service provider also provides a payroll service to the employer 108), and so forth.

The employer profiles 132 and/or employee profiles 134 described herein may be created and maintained using any suitable types of data structures, and using any suitable data storage or database techniques. In some examples, the profile information may be maintained in a relational database in which pieces of information for individual employee profiles and employer profiles may be stored distinctly from one another, but are related to or otherwise associated with particular profiles in the relational database. For instance, a particular employee profile 134 may be obtained by generating a view of a portion the data related in the database to the particular employee profile, or by otherwise extracting the data from the database. Alternatively, of course, other types of storage techniques may be used for generating and maintaining the employee profiles 134 and/or the employer profiles 132.

Additionally, as mentioned above the service provider 104 may also offer a payment processing service to merchants via a payment service module 152. The payment service module 152 may interact with the employer device 108 (or other merchant POS device) to process POS transactions entered into by the employer/merchant with one or more buyers (not shown). For instance, the payment service module 152 may receive payment card information and other transaction information from the employer device 108 when processing POS transactions as the POS transactions are taking place at the POS location 116. The payment service module 152 may forward the payment card information to a payment card clearing house computing device (not shown in FIG. 1) to determine whether a particular payment card is authorized to be charged for the amount of a particular transaction. The payment service module 152 may receive or determine transaction information, such as an overall amount of each transaction, a description of items purchased, an amount charged for each item, an amount charged for tax, an amount of gratuity to be added, and so forth. Thus, in some instances, the employer device 108 may function as a merchant POS device that can receive payments through a variety of payment instruments, including payment cards, checks and cash, as well as enabling electronic payments to be made through a mobile device.

When the employer 114 initially starts using the shift management service, the employer 114 may provide a shift template 154 to the shift management service module 130. For instance, the shift template 154 may include proposed shifts for a specific time duration, such as a week, month, etc. The employer 114 may specify how many shifts within each day are to be scheduled, the type and number of employees per scheduled shift. The employer may further specify preferences for particular employees to work particular shifts, and various other constraints, such as avoiding overtime pay, grouping certain employees with certain other employees, and so forth. In addition, the employer may indicate whether the service may offer added incentives to entice employees to volunteer for undesirable shifts, such as shifts in which gratuity income is low, shifts scheduled on holidays, and the like. Further, the shift management service may be configured to meet state and federal wage requirements, shift scheduling requirements, such as for shift length, breaks, and so forth.

As another alternative, the shift management service may propose a shift template to the employer, such as based on the employer information 136 received about the employer, which may include the type of business, the business size/establishment size, number of customers expected during different times of the day and for different days of the week, and so forth. For instance, the shift management service module 130 may determine this information based on shift information from a plurality of other employers that also use the shift management service and that operate similar types of businesses and of a similar size to that of the particular employer. The shift management service module may provide the proposed shift template to the employer for the employer's approval, such as by presenting the proposed shift template in a GUI 126. Following approval of the shift template 154 by the employer, the shift management service module 130 may enable the employees 112 to access at least a portion of the approved shift template 154, such as for receiving employee preferences for particular shifts, employee availability or unavailability for particular shifts, and the like.

The employees 112 may access the approved shift template either in one of the GUIs 126 on the employer device 108, or in a GUI 128 on an employee device 110. Based at least in part on the shift template, the employees 112 may indicate their availability and unavailability for certain shifts, and/or may indicate their preference for certain shifts based on the shift template. The employees may provide the employee availability and preference information 146 to the shift management service module 130, which may store the employee availability and preferences 146 in association with the corresponding employee profile 134. In addition, the indicated employee availability may also include employee requests for vacation days and/or sick days.

Subsequently, the shift management service module 130 may generate a preliminary populated shift schedule 156 based on the shift template and the employee availability and preferences 146. In some examples, the populated shift schedule may leave one or more shifts open, such as to allow the employees to bid for the open shifts. Additionally, one or more other open shifts may include an offer of an incentive from the employer, such as offering additional compensation to an employee if the employee volunteers to work the particular open shift. Thus, employees may bid on open shifts, decide whether to work a less desirable shift in exchange for an offered incentive, or may send a request to one or more other employees to attempt to swap shifts.

When scheduling particular employees for particular shifts, the shift management service module 130 may consider information about the individual employees as well as information about the employer's business. For example, the shift management service may attempt to schedule the employer's best employees (e.g., most efficient or otherwise most productive employees) during times when the business is expected to have the largest number of customers. Accordingly, the shift management service module 130 may rank or otherwise rate the employees according to performance based on various factors, such as how many transactions the employees typically complete per hour or other unit of time, how much the employees typically earn in gratuities per unit of time, results of customer surveys regarding particular employees, employee history 150, such as may be determined from prior jobs held by particular employees, and the like. Further, the ranking or other performance rating of employees may be for particular shift times. For example, the shift management service module 130 may determine that some employees perform better during morning shifts, while other employees perform better during evening shifts.

In addition, the shift management service module 130 may include built-in intelligence for determining shift entries and scheduling. For example, based on providing shift management services to a large number of employers in a large variety of different types of businesses, the shift management service may collect a large amount of data regarding shift scheduling for particular businesses, including the number of employees typically scheduled for businesses of particular sizes, number of employees typically scheduled for businesses having particular amounts of revenue income, and so forth. Based on the collected shift management data for employers that are similar to a particular employer, the shift management service may provide information to the particular employer, such as whether the particular employer should have a larger number of shifts scheduled or a lesser number of shifts scheduled for particular times. For instance, the shift management service module 130 may determine the amount of revenue taken in by the particular employer over a shift and the number of employees that worked during that shift, to determine a revenue-to-employee ratio, and may compare that with the revenue-to-employee ratios of a large number of similar businesses, such as businesses in the same merchant category, same geographic location, and the like, during the same time of day and day of the week. The shift management service may further provide recommendations to the employer based on a comparison of a number of transactions conducted during a shift, a number of employees working per shift or per hour, and so forth. For instance, the shift management service module 130 may provide recommendations as to how many employees should be staffed for particular shifts, the skill sets required for particular shifts, and so forth.

In addition, suppose that a particular employer wants to increase the size of the employer's business. The shift management service module may provide the particular employer with information as to how many additional employees the particular employer will need to hire, what shifts might already be covered by existing employees, what mix of skill sets the employer will need to hire, and so forth. Similarly, if the employees of a particular employer are substantially underperforming in comparison to employees of similar merchants, the shift management service module may provide this information to the employer along with one or more recommendations for improving the performance, such as recommending scheduling higher performing employees for different shifts, identifying particular underperforming employees, or the like.

In some examples, an employee 112 may be provided an incentive to be on call for certain shifts. For instance, in return for compensation, the employee 112 may agree to be on call and may further agreed to allow the shift management service to track the location of the employee during the shift for which the employee is on call. For instance, the shift management service module 130 may periodically receive an electronic communication, or the like, from the employee device 110 during the shift for which the employee is on call. In some examples, the service computing device 102 may periodically ping the employee device 110 to determine the current location of the employee device 110. In other examples, the employee application 124 may be configured to periodically send an electronic communication to the service computing device to inform the service computing device 102 of the current location of the employee device 110. The service computing device 102 may store the received location information as employee location information 158.

In addition, the shift management service module 130 may monitor the employer's business in real time in relation to current staffing conditions, such as by communicating with the payment service module 152 to determine whether the number of transactions being conducted at the employer's business exceeds an historic number of transactions by a threshold amount for a particular time of day, day of the week, etc. Based on this or other input from the employer, if the shift management service determines that the employer's business is currently experiencing an unexpected surge in customer business, the shift management service may determine, from the employee location information 158, a location of the nearest employee 112 that is currently on call and able to perform the employee position, and may send a communication to that employee 112 to request that the employee 112 come in to work to help handle the unexpected increase in business at the employer's establishment.

If the employee first contacted does not respond, the shift management service module may refer to the location information 158 to determine the next nearest employee that is currently on call and able to perform the employee position, and may send a communication to that employee to request that the employee come in to work.

In addition, in some examples, the employees may agree to have their locations determined prior to their scheduled shifts. For instance, the shift management service module 130 may determine, e.g., based on employee location information 158, that an employee will be late or has not shown up to work for a scheduled shift, such as based on location information received from the employee's mobile device. In response, the shift management service module 130 may automatically contact a replacement employee to fill the position of the employee that is absent. For instance, the shift management service module 130 may identify an employee that is on call and that is near to the employer's place of business, and may send an electronic communication to the on-call employee to request that the employee come in to work. Alternatively, if no employees are on call, the shift management service may identify an employee that is not currently scheduled for a shift, able to perform the employee position, and that is within a threshold distance of the place of business, and may send a communication to the employee to determine whether the employee is willing to fill the shift for the absent employee.

As still another example, the shift management service may identify an employee already scheduled for the shift in a different role, and that is able to fill the shift for a more critical role. For instance, suppose that a first employee, Anna, is the only bartender scheduled for a particular shift, but she will not be able to work the particular shift. Further, suppose that there are five servers currently scheduled for the same shift, and at least one of the servers, Betty, is qualified to act as bartender. Accordingly, the shift management service module 130 may select the one of the servers who is qualified, i.e., Betty, to be the bartender for the particular shift. For example, the bartender may be considered a more critical role to fill, as there is only a single bartender scheduled, but there are four other servers scheduled. As one example, the shift management service module 130 may send a communication to Betty's electronic device 110 and/or to an employer device 108 to which Betty logs in, to request that Betty assume the bartender position in Anna's absence.

In addition, suppose that the bartender is typically paid at a higher wage than a server at this establishment. Accordingly, as an incentive for the server to accept the role of bartender for the particular shift, the shift management service module 130 can offer the server the higher wage associated with the bartender role. Thus, in some examples, an amount of wages paid may be associated not only with particular employees, but also with particular roles or positions, and the wages paid to a particular employee may be varied based on the position filled by the particular employee for a particular shift. Therefore, one incentive for an employee, such as Betty, to fill a different role for a particular shift may be that the employee will receive a wage associated with the filled-in position, which may be a higher wage than the wage paid to the employee in the employee's usual position, i.e., as a server. This may also provide, at least in part, an incentive for some employees to agree to be on-call for certain shifts, e.g., for a position that pays a higher wage than the employee's usual position.

As another example, if the service provider determines that the employer is currently overstaffed, the service provider may select an employee that may not be currently needed, and may offer the employee an incentive to leave early. For example, as mentioned above, the service provider may receive transaction information from the employer for processing payments for the employer. As one example, if the service provider determines that the number of transactions being processed at the employer's place of business over a period of time on a particular day is below a threshold amount, the service provider may determine that the employer is overstaffed at that time. Based on this determination, the service provider may select an employee that may not be needed, and may send the employee a communication including an incentive for the employee to depart work early. For example, depending on the amount of time left in the employee's shift, the incentive may offer the employee a certain percentage of pay to leave early. In some cases, the employee selected to leave early may be determined based on staffing practices of a plurality of business that are similar to the employer's business, such as in the same merchant category, same geographic region, and so forth. Thus, the shift management service may select an employee position that is overstaffed based at least in part on the information from other employers, and send the communication to a corresponding employee.

As another example, the employer device 108 may also function as a merchant POS device, as mentioned above. For instance, the employer device 108 may include a card reader, a barcode scanner, a cash drawer, etc., (not shown in FIG. 1), which may be used to process transactions with customers of the employer, such as payment card transactions, electronic payment transactions, cash transactions and/or check transactions. The transaction information associated with these transactions may be sent to the payment service module 152, and made available to the shift management service module 130. Such transaction information may include an amount of each transaction, the name, ID number or other identifier of the employee who conducted the transaction, the item sold, and the like.

As an example, a particular employee may log in to the employer device 108 at the start of a shift, and POS transactions conducted by the particular employee using the employer device 108 during the shift may be attributed to the particular employee. Thus, the payment service module 152 receives information regarding the employee present at the POS location for a particular shift, as well as the amount of revenue attributable to the particular employee during the particular shift. Over time, the payment service module 152 may receive attendance and performance information for a plurality of employees based on employee logins that enable respective employees to process transactions on the employer device 108 as a POS device.

The shift management service module 130 may access this POS transaction information and employee login information for use in determining employee performance ratings and employee attendance. Thus, the shift management service module 130 may apply this information for scheduling future shifts for respective employees, such as for assigning particular employees to particular shifts based on measured performance during those shifts in the past. As an example, the assignments of respective employees to respective shifts may be based at least in part on employee performance ratings that are based at least in part on the transaction information.

As another example, the employer device 108 may present, on the display 112, one of the GUIs 128, which may include presentation of a shift schedule for upcoming future shifts. The employer device 108 may receive, via the GUI, an input to the shift schedule, and may update the shift schedule based at least in part on the input. For instance, the update may be based at least in part on an identity of an employee that is currently logged in to the employer device 108, such as for using the employer device 108 as a POS device. For instance, the employee may make an input via the GUI to request a change to an assigned shift, a shift swap with another employee, or may bid on unassigned shifts, such as shifts for which the employer is offering an incentive, or for shifts that are open to bidding by a plurality of employees that would like to work the shift, as described additional elsewhere herein.

Additionally, as mentioned above, an employee may have multiple jobs and, therefore, may be employed by more than one employer. For instance, suppose that an employee has two jobs, a first job in which the employee waits tables, and a second job in which the employee works at a retail store. The shift management service module 130 may manage the shift scheduling for the employee for both the first job and the second job, and may do so even if the first employer is unaware that the employee is also working for the second employer, and vice versa.

Access to the employee profile 134 may be controlled by requiring entry of an employee credential as authorization information to access the employee profile 134 of a respective employee. For example, employee authorization information may include a password, biometric information, such as a fingerprint, or other employee credential. Accordingly, the employee may own, control or otherwise manage the employee information 144 that the employee provided to the shift management service module 130, and the employee may have control over whether an employer is permitted to access the employee information 144 in the employee profile 134. Thus, the employee information 144 in the employee profile 134 may be protected from unauthorized access.

Furthermore, the employee 112 may provide and/or the service provider 104 may generate the employee history 150 for the employee 112. For instance, as the employee 112 uses the shift management service, the service provider 104 may update and maintain the employee history 150, such as by keeping records of employee attendance to scheduled shifts, e.g., the hours worked by the employee 112, the days of the week worked by the employee 112, average hours worked per week, willingness to work undesirable shifts, willingness to be on call, employee performance information, and so forth. Thus, when the employee 112 applies for a new job with a prospective employer, the employee 112 may instruct the service provider 104 to send the employee history 150 to the prospective employer. Alternatively, if the employee believes that the employee history 150 is not flattering, or would otherwise not be beneficial, the employee may elect not to share the employee history 150 with the prospective employer.

FIG. 2 illustrates an example GUI 200 including a shift scheduling template 202 according to some implementations. The example GUI 200 may be presented on the display 118 associated with the employer device 108 as a portion of a shift management tool. The GUI 200 and other GUIs discussed herein are illustrated for use with a touch input device and, accordingly, the display 118 may include a touch sensor (not shown in FIG. 2). However, other types of interfaces may be used with the examples herein and, accordingly, the examples herein are not limited to any particular type of interfaces or user input devices.

The employer application may present the GUI 200 on the employer device, and thus, the GUI 200 may correspond to the one or more GUIs 126 discussed above with respect to FIG. 1. As one example, the GUI 200 may be presented on the employer device in response to a user selection of a button, link, or other virtual control on the employer device, which may cause execution of a shift management module of the employer application. As another example, such as in the case that the shift management tool includes web-based content, a browser or other employer application 120 on the employer device may be navigated by the user to a network location to access the GUI 200. In this case, the GUI 200 may be presented based at least in part on HTML (hypertext markup language) content, JAVASCRIPT® code, or the like, received from an online site associated with the service provider 104. Other variations will be apparent to those of skill in the art having the benefit of the disclosure herein.

The GUI 200 includes the shift scheduling template 202, which in the illustrated example, is for a restaurant or similar type of establishment. The shift template 202 in this example includes a listing of employee positions 204, a plurality of time periods 206, which in this example are days of a week, or portions thereof, and shifts 208 to be scheduled for the time periods 206. The shifts 208 set forth a proposed amount of time that an employee will work during a given time period 206, i.e., on a corresponding day. For instance, the template 202 lists a first chef position 210, which has scheduled shifts from 4:00 pm-10:00 pm on Monday-Friday, a shift from 11:00 am-6:00 pm on Saturday, a shift from 6:00 pm-12:00 am on Saturday night, a shift from 11:00 am-5:00 pm on Sunday, and a shift from 5:00 pm-10:00 pm on Sunday night. Further, on some nights during the week that are busier than others, a second chef position 212 may be scheduled. The second chef position includes a shift from 6:00 pm-12 am on Friday, a shift from 5:00 pm-11:00 pm on Saturday night, and a shift from 4:00 pm-10:00 pm on Sunday night.

Additional employees that may be scheduled for shifts in this example include a bartender 214, a first server 216, a second server 218, a third server 220, a fourth server 222, a first kitchen staff 224, a second kitchen staff 226, a third kitchen staff 228, a first host/hostess 230, and so forth. For example, during less busy times, such as Monday through Thursday, Saturday during the day, and Sunday during the day, the second chef position 212, fourth server position 222, and third kitchen staff position 228 may not be needed and therefore these shifts are marked as "N/A." Additional positions in the listing of employee positions 204 may be viewed, such as by scrolling the shift schedule template 202. Accordingly, as indicated at 232, the shifts available for scheduling for a particular week may be viewed by a user, such as the employer.

As one example, the shift schedule template 202 may be initially generated for the employer by the shift management service, such as based on shift scheduling information received from a large number of other merchants. As mentioned above, the service provider 104 may provide the shift management service to a large number of merchants, and may compare the shift requirements of a plurality of merchants classified in the same merchant category as the present merchant. For instance, the service may compare the present merchant with merchants in the same merchant category having approximately the same sized establishment, approximately the same expected revenue, approximately the same number of customers, and so forth. The categories of the merchants can be determined, for example, using the merchants self-declared business category or using merchant category codes (MCC). The MCC is a four-digit number assigned to a business by credit card companies (e.g., AMERICAN EXPRESS®, MASTERCARD®, VISA®) when the business starts accepting payment cards as a form of payment. The MCC is used to classify the business by the type of goods or services provided by the business. Thus, the MCC for a merchant or other classification techniques may be used to categorize similar types of merchants into merchant categories. In some examples, the merchant categories used herein do not match the MCC categories, but may be more inclusive or less inclusive categories. Similarly, the merchants may be classified into location categories, such as for particular categories of geographic regions, e.g., same street, same neighborhood, same postal code, same district of a city, same city, and so forth.

Alternatively, rather than having the service provider generate the template, the employer may manually generate the initial shift schedule template 202, such as based on past shift requirements, employer experience, or the like. For example, the shift management service may provide a blank template that the employer may fill in manually when the employer first starts using the shift management service. Subsequently, the shift management service may propose revisions to the employer based on the information discussed above, such as the shift scheduling practices of a large number of similar merchants at a similar geographic location.

When the employer is satisfied with the shift schedule template 202, the employer may select a virtual control to have the shift management service assign shifts to individual employees of the employer. For example, the employer may select an "assign shifts" virtual control 234 provided in the GUI 200. Based on this selection, the shift schedule template 202, or at least the information contained therein, may be sent to the shift management service module on the service computing device. The shift management service module may then fill in or otherwise populate the shifts 208 by assigning particular shifts 208 to particular employees based on various considerations as discussed above and as discussed additionally below. The shift management service may then send a preliminary populated shift schedule, or at least the information for populating the shift schedule, to the employer device, and the employer device may present the preliminary populated shift schedule on the display 118.

In addition, the GUI 200 may include other virtual controls such as a virtual control 236 to enable the employer to view a shift history of the employer's business, such as shifts that were previously scheduled for various different employees, scheduled for various different dates, and so forth. In addition, the GUI 200 may include a virtual control 238 to enable the employer to select a different week for which to view the proposed shift schedule. Further, the GUI 202 may include a virtual control 240 to enable the employer to view employee information such as employee availability, employee preferences, and so forth.

Figure 3:
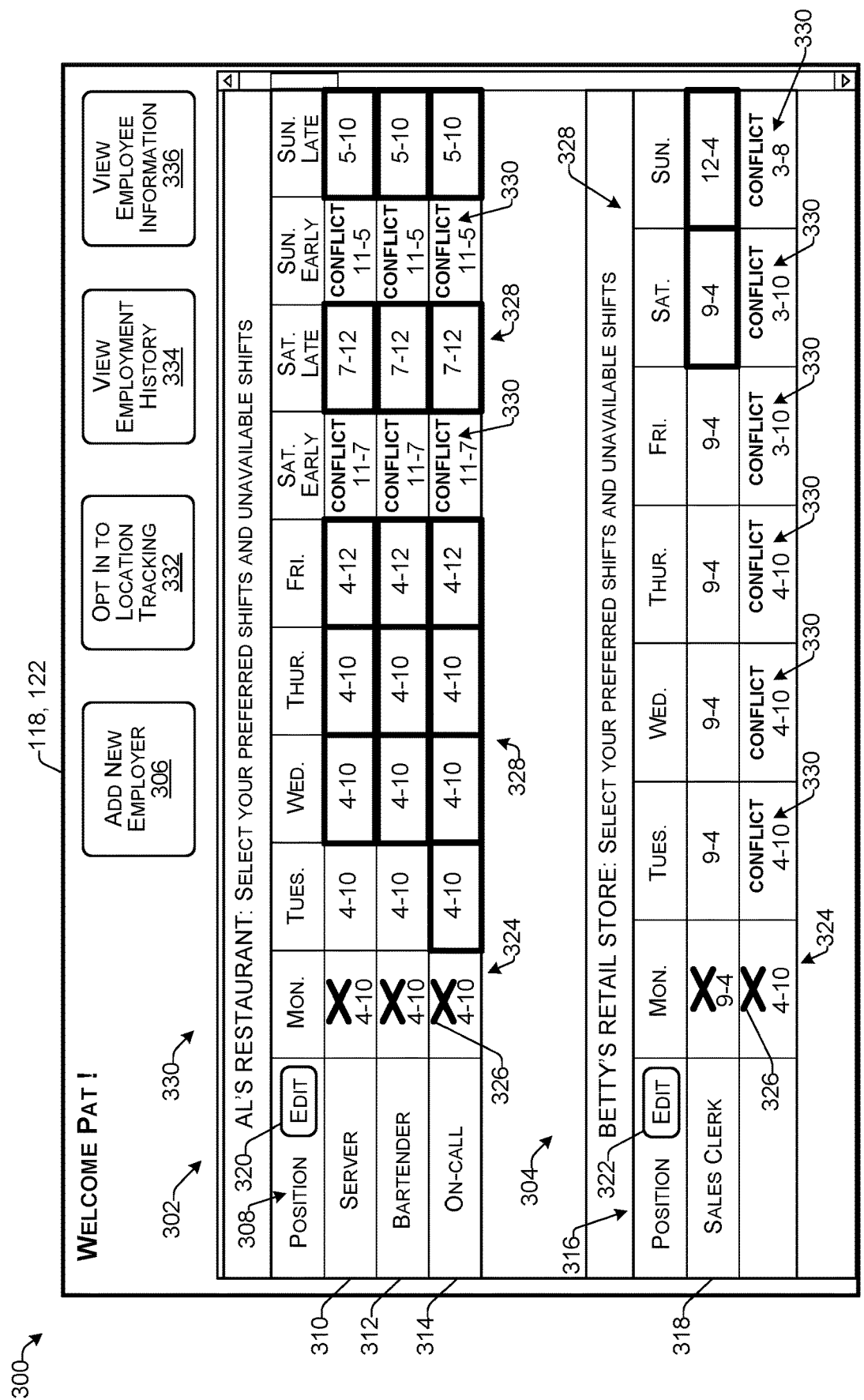
FIG. 3 illustrates an example GUI for shift management by an employee according to some implementations.

FIG. 3 illustrates an example GUI 300 that may be presented to an employee to enable the employee to specify particular shifts that the employee would prefer to work, specify particular shifts that the employee is not available to work, and to indicate various other employee preferences or availability information. In some cases, the GUI 300 may be accessed by the employee on the employer device, such as by the employee using the employer device to sign in to his or her employee profile. In other cases, the GUI 300 may be accessed through the employee device, such as by the employee using the employee application on the employee device to sign in to or otherwise access his or her employee information. Thus, in some situations, the GUI 300 may be presented on the display 118 of the employer device, while in other situations, the GUI 300 may be presented on the display 122 of the employee device, or other suitable device including a display.

The GUI 300 enables the employee to manage the employee's shift scheduling preferences for multiple employers using a single interface. For instance, a first shift schedule 302 is presented for a first employer, which in this example is a restaurant called "Al's Restaurant," and a second shift schedule 304 is presented for a second employer, which in this example is a retail store called "Betty's Retail Store." Suppose that an employee, Pat, interacts with the GUI 300 and has used an "add new employer" virtual control 306 to add Betty's Retail Store as a new employer to the jobs for which Pat is currently employed. For instance, the "add new employer" virtual control 306 may be selected by Pat to enable Pat to select an employer that has previously indicated that Pat should be added to the employees that are scheduled for shifts for the particular employer. In this example, suppose that Pat has added Bob's Retail Store as an employer because Pat is taking a second job to earn extra money.

The shift schedule 302 for Al's restaurant may include a listing 308 of one or more positions that Pat is able to perform for the employer, which in this example includes a server position 310, a bartender position 312, and an on-call position 314. For instance, the on-call position 314 may indicate that the employee is willing to be on call during certain shifts for which the employee is not already scheduled to work. Similarly, the shift schedule 304 for Betty's Retail Store also includes a listing 316 of positions, which in this example includes only a sales clerk position 318.

In addition, the GUI 300 may include "edit" virtual controls 320 and 322, which may be selectable by the employee to edit the employee positions for which the employee is currently scheduled for the particular employer. For example, Al's Restaurant may have authorized Pat to also serve as host/hostess, kitchen staff, or the like. Accordingly, Pat may select the "edit" virtual control 320 to be presented with a window, listing, etc. to enable scheduling for other positions with Al' Restaurant, or alternatively, if Pat would like to remove one of the employee positions for which Pat is currently able to be scheduled. With respect to the job at Betty's retail store, suppose that Pat is only authorized by the employer to work as a sales clerk at Betty's retail store. Accordingly, should Pat attempt to use the "edit" virtual control 320 to add another position, there may be no additional positions available for selection.

As indicated at 318, Pat has indicated that Pat is not available to work on Mondays for either employer. For instance, Pat may have selected each of these shifts and indicated unavailability, which may result in a visual indication, such as a cross-through 326, or the like, being presented in the GUI 300 to indicate that Pat should not be scheduled for those shifts. In addition, as indicated at 328, Pat has indicated the shifts that Pat would prefer to work, such as by selecting each shift, which may result in the shift being outlined, highlighted or otherwise visually indicated. Thus, Pat has indicated that Wednesday through Friday and weekend evening shifts at Al's Restaurant for either server position 310 or bartender position 312 would be preferred, and that day shifts on Saturday and Sunday at Betty's Retail store would be preferred.

In addition, the shift management service module may automatically identify conflicts with selected shifts for other employers, and as indicated at 330, may present a conflict indicator, such as the word "conflict" or other visual indication in association with these shifts. As one example, the shift manager service module may determine that a conflict with another shift exists based at least in part on an overlap of a time of day of a first shift and a time of day of a second shift on the same day. For instance, the shift management service module may determine based on Pat's selections of preferred shares for Al's Restaurant that Pat is not able to be scheduled for the evening shifts at Betty's Retail Store. Similarly, based on Pat's selection of day shifts on Saturday and Sunday at Betty's Retail Store, the shift management service module may determine that Pat is unavailable to work the early shifts on Saturday and Sunday at Al's Restaurant. Accordingly, the shift management service module may automatically avoid scheduling the employee for certain shifts, which the employee is or may be scheduled to work for a different employer.

The GUI 300 may further include additional virtual controls for performing additional functions. In this example, the GUI 300 includes an "opt in to location tracking" virtual control 332 that may be selected by Pat to authorize the shift management service to track the location of Pat's mobile device, such as during the on-call shifts or preceding or during shifts for which Pat is scheduled to work. For example, the shift management service may use location tracking to determine that Pat is too far away from the employer's place of business to arrive on time for the start of a particular shift for which Pat is scheduled to work. In response, the shift management service may send a communication to Pat's mobile device to inquire as to whether Pat will be coming in late, or whether a replacement employee should be called in to cover the shift entirely in Pat's place. In some instances, if Pat does not respond within a threshold time, the shift management service may automatically contact an on-call employee or another employee who is determined to be within a threshold distance of the employer's place of business and able to perform the employee position. As one example, the shift management service may send a communication to an employee who was already at the place of business, such as finishing an earlier shift, to request whether the employee is interested in working the next shift in place of Pat or until Pat is able to arrive.

In addition, the GUI 300 may include a "view employment history" virtual control 334, which may be selected by the employee to enable the employee to view the employee's employment history, such as record of attendance to assigned shifts at past and current employers, performance numbers related to those shifts such as whether the employer's revenue or other efficiency indicators are above average, average, or below average during the shifts that the employee was working, and various other information that, if favorable, may be useful to the employee when seeking employment in the future. Accordingly, in some examples, the employee may be offered the option of sharing the employment history information with an employer with whom the employee is applying for a job.

In addition, the GUI 300 may include a view employee information virtual control 336, which may be selected by the employee to enable the employee to view the employee's information maintained by the service provider such as the employee's contact information and other demographic information. Furthermore, if the service provider also provides a payroll service to the employer, then the employee information may further include tax information such as a taxpayer ID number, tax withholding information and so forth.

Figure 4:
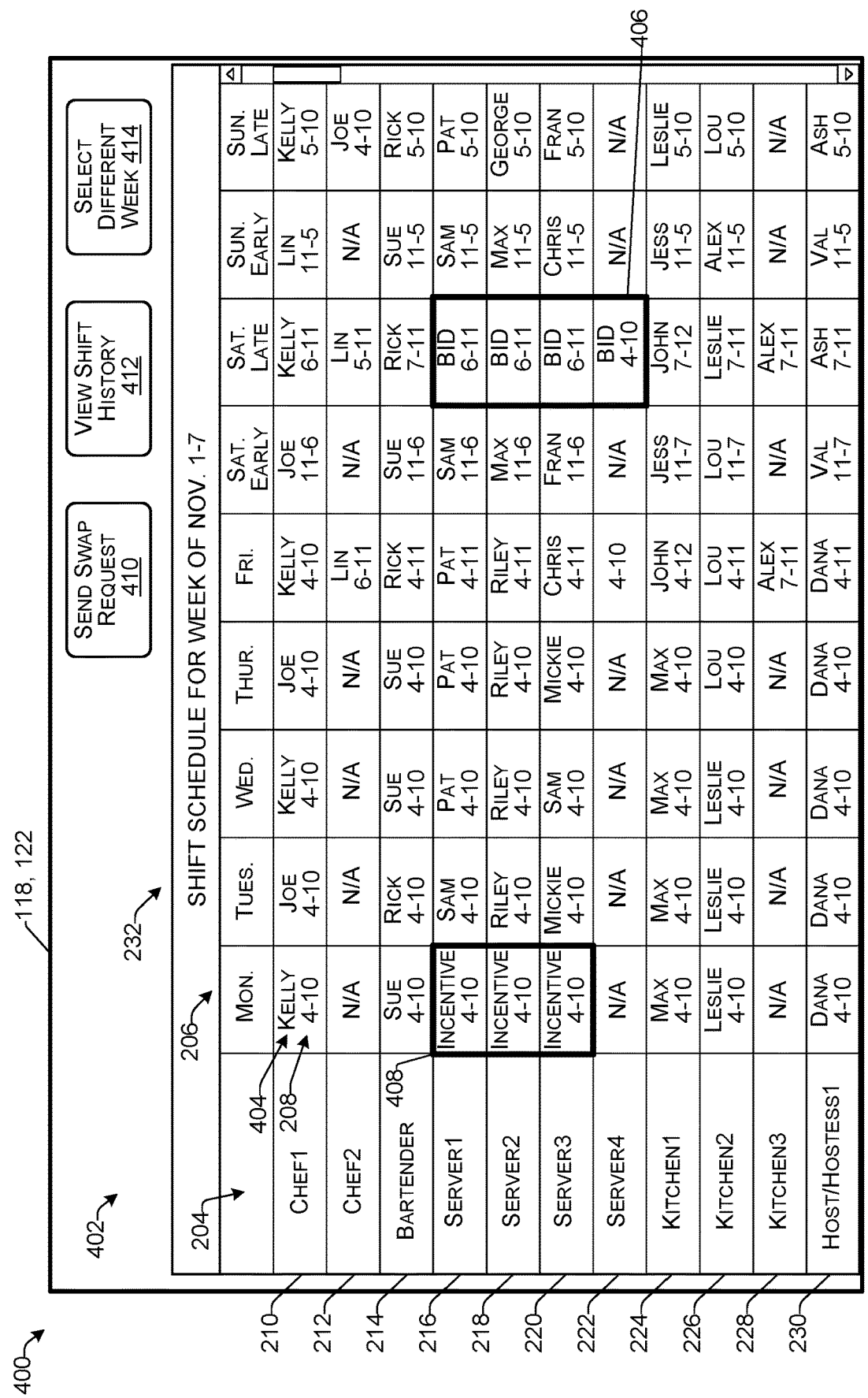
FIG. 4 illustrates an example GUI for shift management by an employee according to some implementations.

FIG. 4 illustrates an example GUI 400 that may be presented to an employee to enable the employee to view a shift schedule 402 and, if applicable, bid on or otherwise select one or more shifts that may be still available for scheduling. In some cases, the GUI 400 may be accessed by the employee on the employer device. In other cases, the GUI 400 may be accessed through the employee device, such as by the employee using the employee application on the employee device to access the shift schedule 402. Thus, in some situations, the GUI 400 may be presented on the display 118 of the employer device, while in other situations, the GUI 400 may be presented on the display 122 of the employee device, or other suitable device including a display.

As one example, suppose that the shift management service module populates the shift schedule 402 and sends the populated shift schedule 402 to the employer device for the employer's review. The employer may review the shift schedule make any changes if desired, and send an indication of approval to the shift management service module. In response, the shift management service module may send communications to the individual employees to inform individual employees that the shift schedule for a particular time period is available. Alternatively of course the employer may inform the employees that the shift schedule 402 is available, or the employees may have already been informed that the shift schedule 402 would be available on a regular basis, such as at a particular time on a particular day of the week.

The shift schedule 402, for each shift that has been assigned to a particular employee, may include a name 404 corresponding to that employee, such as listed in the area associated with the respective shift. In addition, as indicated at 406, the shift schedule 402 may include one or more shifts that the employer has left open to allow the employees to bid on being scheduled for those shifts. For example, the Saturday night shift at the particular restaurant may historically be the most profitable time for a server to receive gratuities. Accordingly, most of the servers may prefer to be scheduled for the Saturday night shift. The employer may allow the employees to bid on being scheduled for the Saturday night shift, such as by indicating a willingness to work for a lower hourly wage during the particular shift. Thus, as indicated at 406, these shifts may be marked with a "Bid" indicator or other suitable indicator that lets the employees know that the employees may bid on working these shifts.

In addition, as indicated at 408 the shift schedule 402 may include one or more shifts that are indicated to be available to be filled and for which the employer is offering an incentive for an employee to accept scheduling for the particular shift. For instance, the Monday shift for servers may be difficult to fill because the gratuity money earned on that day may be less than on other days. Accordingly, the employer may offer incentives such as 1.2× hourly wage, or the like, to entice employees to be scheduled for the particular shift, as discussed additionally below with respect to FIG. 6.

Further, the GUI 400 may include additional virtual controls that may be used by the employee for various functions. In this example, the GUI 400 includes a "send swap request" virtual control 410 that may be used by the employee to send a request to another employee to swap shifts with the other employee. For instance, selection of the virtual control 410 may cause a pop-up window, or other user interface, to be presented to the employee to enable the employee to select particular shifts that the user would like to swap with another employee.

Additionally, the GUI 400 may include a "view shift history" virtual control 412 that may be selected by the employee to view shifts that the employee has worked in the past. Further, the GUI 400 may include a "select different week" virtual control 414 that may be selected by the employee to view shift schedules for a different week or different time period, if such are available.

FIG. 5 illustrates the example GUI 400 with the shift schedule 402 presented on the display 118 of the employer device or the display 122 of the employee device. In this example, suppose that the employee has decided to bid on working the Saturday night shift. The employee may tap on or otherwise select one of the shifts that is available for bidding, as indicated at 406, which may result in a graphical element, such as a pop-up window 502, or other suitable interface, being presented in the GUI 400. The window 502 includes an invitation 504 for the employee to place a bid to be assigned to the particular shift. In addition, the window includes a plurality of selectable virtual controls 506-514 that include preset bids that the employee may select to place a bid on the particular shift. In addition, the window 502 includes a selectable virtual control 516 that the employee may select to place a custom bid on the shift, such as by manually entering a number, a percentage, a word, or the like. In some examples, the employees may enter their bids and be subsequently informed which employee is a winner. In other examples, the employees may be informed if their bid is not the current winning bid, and may be provided with an opportunity to beat the current winning bid, i.e., the lowest bid in this example.

Figure 6:
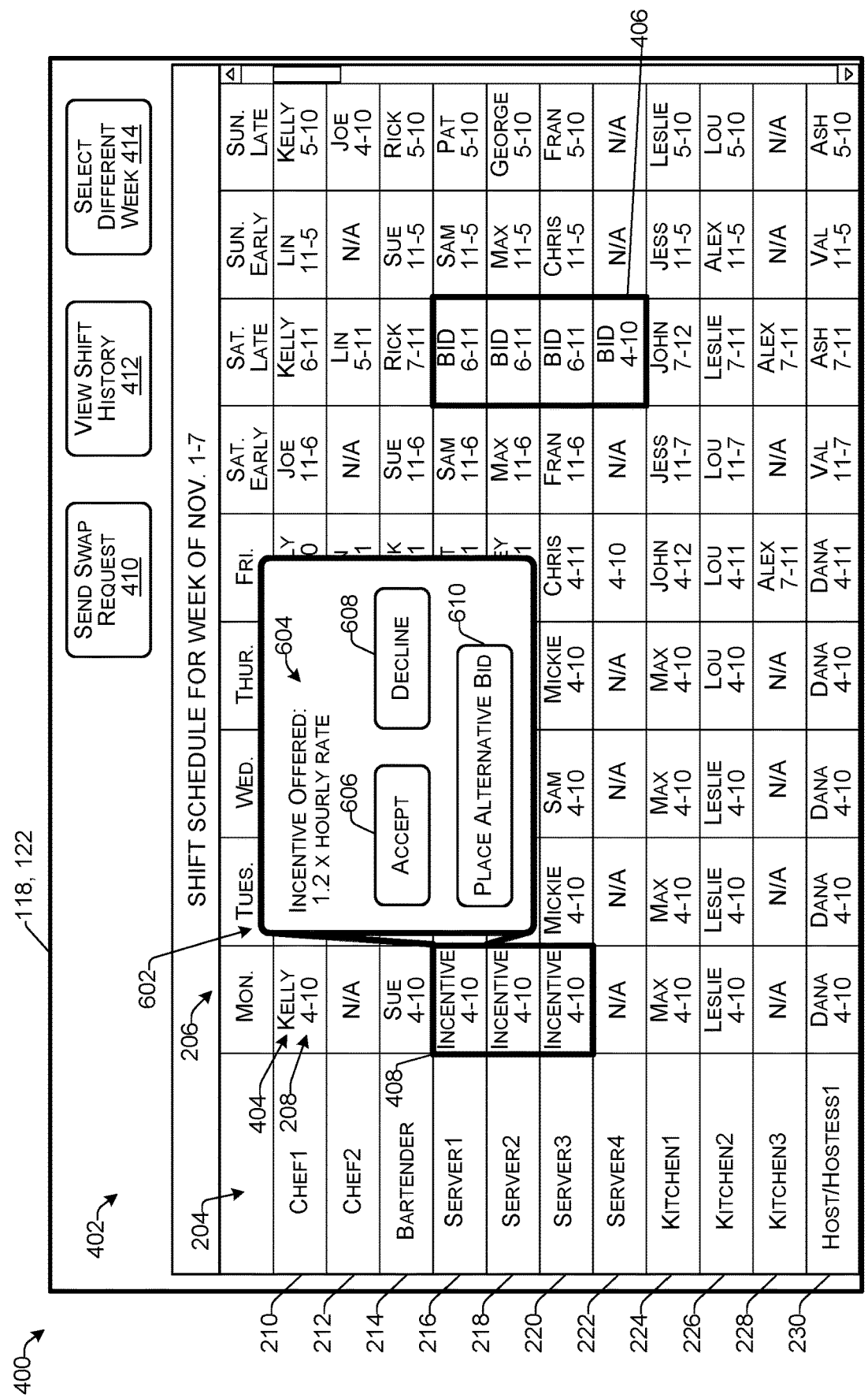
FIG. 6 illustrates an example GUI for shift management by an employee according to some implementations.

FIG. 6 illustrates the example GUI 400 with the shift schedule 402 presented on the display 118 of the employer device or the display 122 of the employee device. In this example, suppose that the employee has decided to view the incentive offered by the employer for working a Monday shift, as indicated at 408. The employee may tap on or otherwise select one of the shifts and may be presented with a graphical element, such as a pop-up window 602, or other suitable user interface. The window 602 may indicate the current incentive offered 604, which in this example is 1.2× the employee's current hourly wage. The window 602 further includes a first selectable virtual control 606, which may be selected to accept the offered incentive, and a second selectable virtual control 608, which may be selected to decline the offered incentive and close the window 602. In addition, the window 602 includes a third virtual control 610, which may be selected to enable the employee to place an alternative bid for working the particular shift, such as by manually entering a number, percentage, word, or the like. For example, the employee may enter a bid for a higher wage than that currently offered by the employer such as 1.5× the employee's current established hourly rate, 2× the employee's current established hourly rate, etc. Further, in some examples, if the employer does not have any employees accept the initial incentive, the employer may progressively increase the incentive until the shifts are filled.

Figure 7:
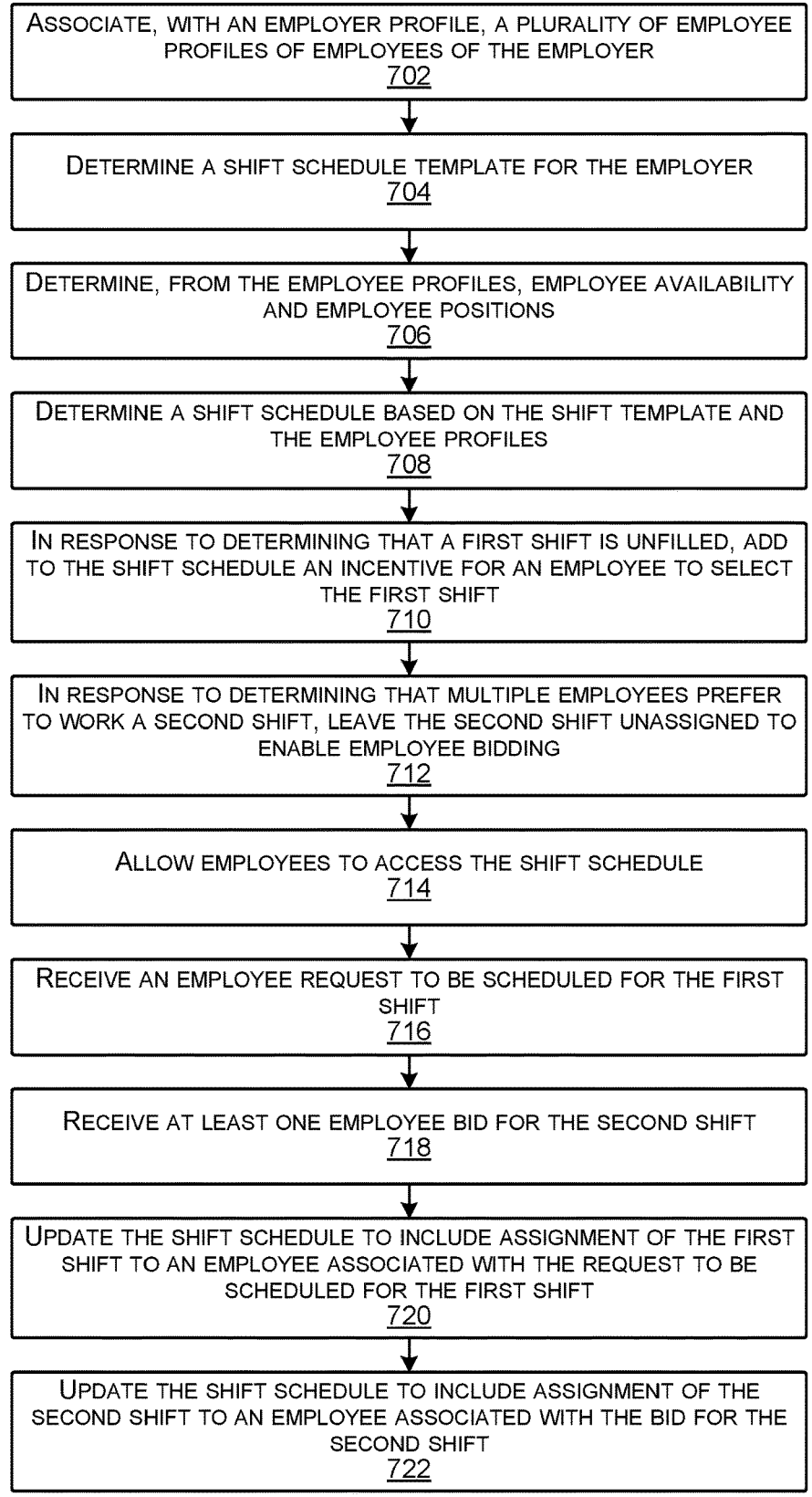
FIG. 7 is a block diagram illustrating an example process for shift management according to some implementations.
Figure 8:
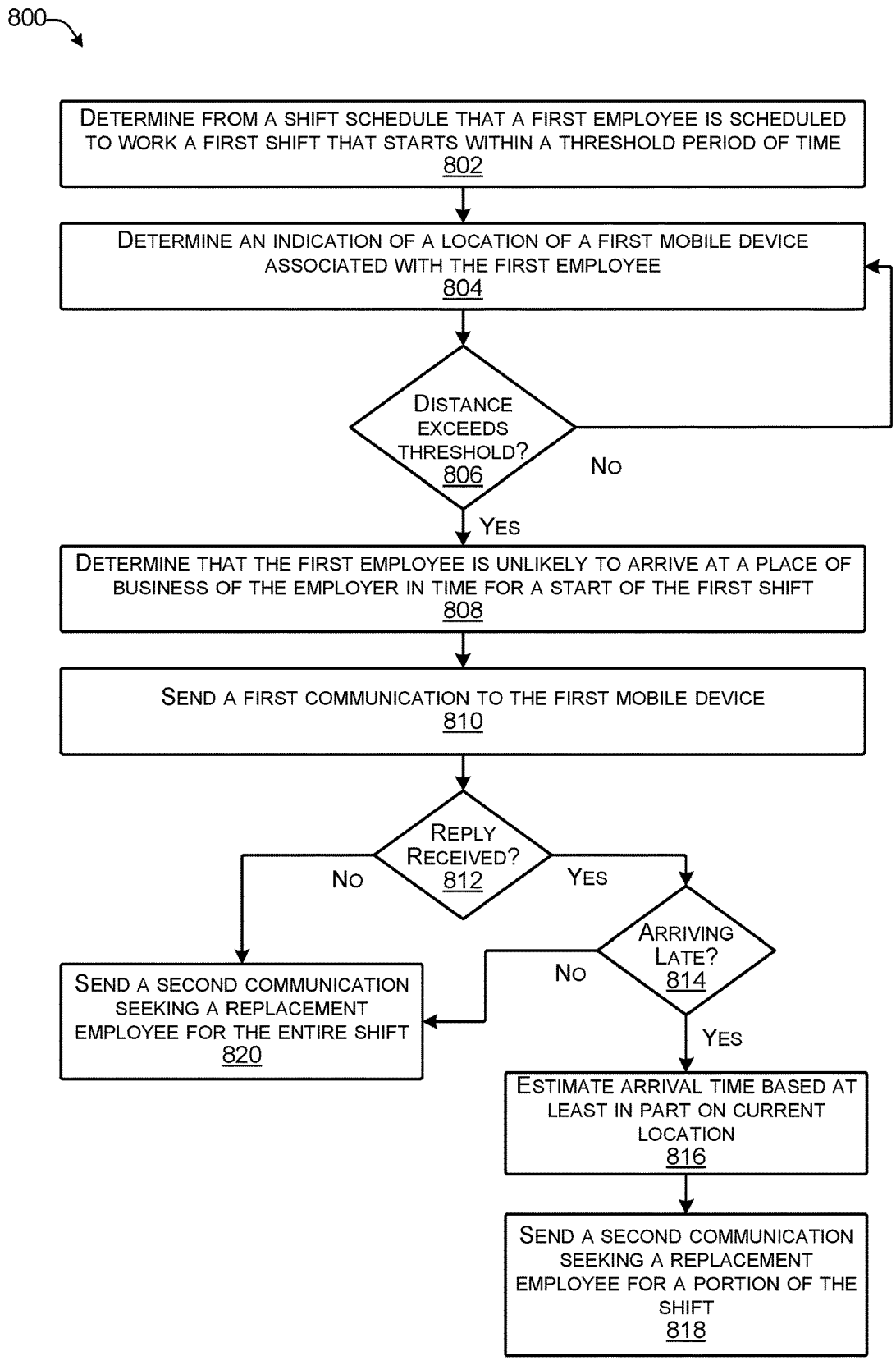
FIG. 8 is a block diagram illustrating an example process for shift management according to some implementations.
Figure 9:
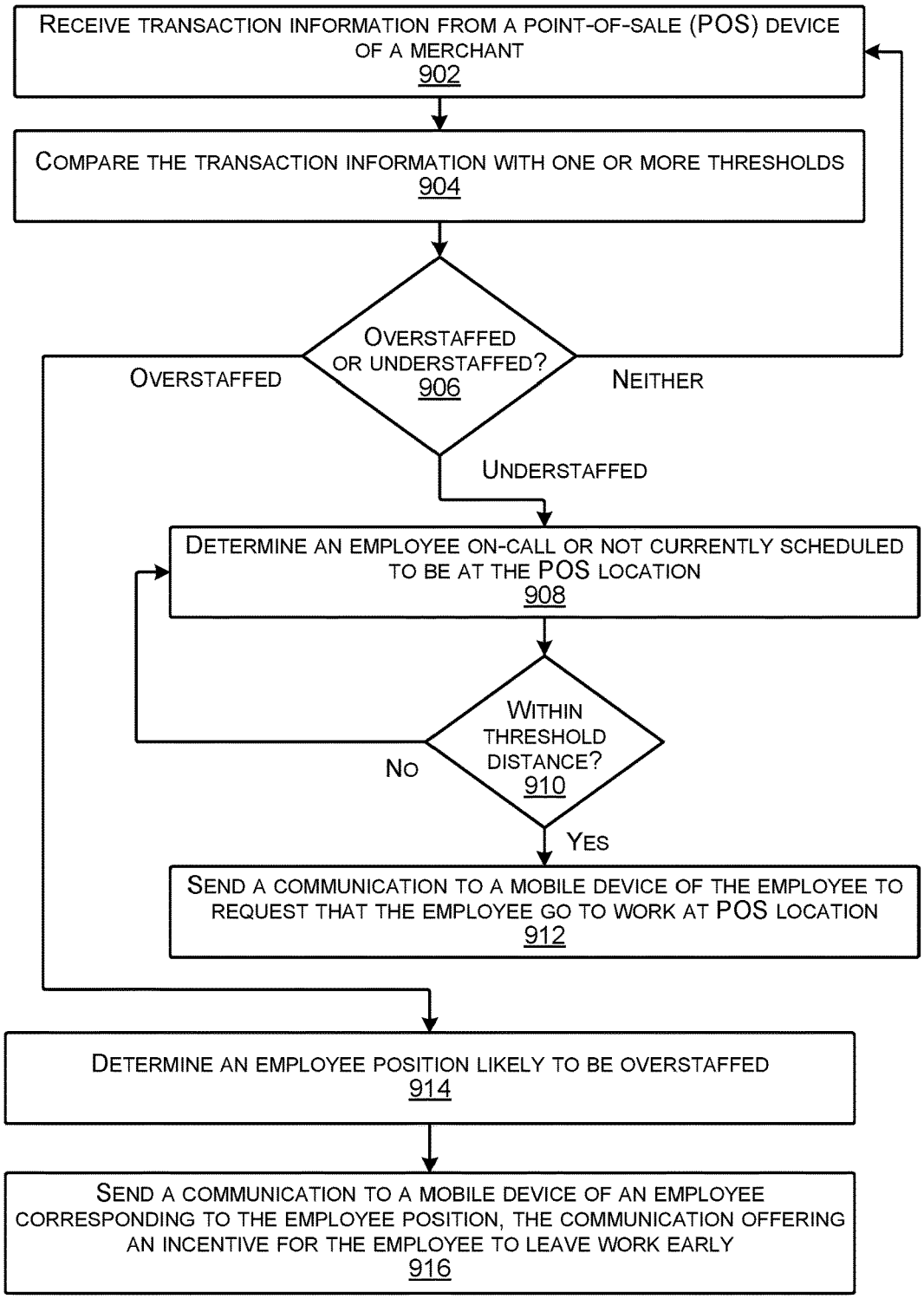
FIG. 9 is a block diagram illustrating an example process for shift management according to some implementations.

FIGS. 7-9 are flow diagrams illustrating example processes for shift management according to some implementations. The processes of FIGS. 7-9 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the processes, or alternative processes, and not all of the blocks need be executed. For discussion purposes, the processes are described with reference to the environments, architectures and systems described in the examples herein, although the processes may be implemented in a wide variety of other environments, architectures and systems.

FIG. 7 illustrates an example process 700 for shift management according to some implementations. In some examples, the process 700 may be executed by one or more processors of the service computing device 102 associated with the service provider 104, or by one or more other suitable computing devices.

At 702, the computing device may associate, with an employer profile, a plurality of the employee profiles corresponding to employees of the employer. For example, the employee profiles may be for employees that are available to be assigned to one or more shifts of a plurality of shifts to work for the employer.

At 704, the computing device may determine a shift schedule template for the employer. For example, the shift schedule template may indicate a start time, a duration or end time, a day of a week, and an employee position for individual shifts of the plurality of shifts. In some instances, the shift schedule template is determined based at least in part on shift scheduling information received from a plurality of other merchants in a same merchant category and/or similar geographic location as the employer.

At 706, the computing device may determine, from the employee profiles, employee availability and employee positions. For instance, the employee profiles may indicate employee availability, which may include an indication of a day of the week during which an individual employee is available to work or prefers to work and an indication of the employee position for which the employee is available to work.

At 708, the computing device may determine a shift schedule based on the shift template and the employee profiles. For instance, the computing device may determine the employee assignments from the employee profiles based on an indication of employee availability of respective employees. Additionally, in some examples, the computing device may determine the shift schedule based at least in part on a comparison of employee performance ratings of respective employees. For instance, the employee performance ratings may be determined based on at least one of: an amount of gratuities received by the respective employees over time; information received from customers related to the respective employees, such as through customer surveys, comments received in response to sending receipts to customers and so forth; or employee histories indicating, for the respective employees, employee performance at prior jobs, as discussed above. Furthermore, the shift schedules may also be determined based on a determination of employee positions indicated in the employer profile to be authorized for respective employees.

At 710, the computing device may, in response to determining that a first shift is unfilled, add to the shift schedule an incentive for an employee to select the first shift. For example, the offered incentive may include added pay in addition to an established wage of the employee.

At 712, the computing device may, in response to determining that multiple employees prefer to work a second shift, leave the second shift unassigned to enable employee bidding on the second shift.

At 714, the computing device may allow employees to access the shift schedule. For example, the employees may receive a communication indicating that the shift schedule is available to be viewed. In some cases, an employee may access the shift schedule either on the employee's device or on the employer's device.

At 716, the computing device may receive an employee request to be scheduled for the first shift. For instance, the employee may select a shift in a graphic user interface, and may accept being assigned the shift in exchange for receiving the offered incentive from the employer.

At 718, the computing device may receive at least one employee bid for the second shift. For example, receiving the bid for the second shift may include receiving a plurality of bids associated with a respective plurality of employee profiles, and determine to whom to assign the second shift based on determining a lowest bid for lowest compensation of the plurality of bids.

At 720, the computing device may update the shift schedule to include assignment of the first shift to an employee associated with the request to be scheduled for the first shift.

At 722, the computing device may update the shift schedule to include assignment of the second shift to an employee associated with the bid for the second shift.

FIG. 8 is a flow diagram illustrating an example process 800 for shift management according to some implementations. In some examples, the process may be executed by the service computing device of the service provider or by one or more other suitable computing devices.

At 802, the computing device may determine from a shift schedule that a first employee is scheduled to work a first shift that starts within a threshold period of time. As one example, the threshold period of time may be one half hour before the start of the shift.

At 804, the computing device may determine an indication of a location of a first mobile device associated with the first employee. For example, the first employee may have opted in to having his or her location tracked for a period of time associated with the shift for which the employee is scheduled. For instance, the system may begin tracking the location of the employee at the beginning of the day for which the employee is scheduled to work, an hour before the employee's shift is scheduled to start, or the like.

At 806, the computing device may determine whether a distance of the first mobile device from the employer's place of business exceeds a threshold distance. If not, the process returns to 804 to continue to monitor the location of the first mobile device with respect to the employer's place of business.

At 808, if the distance exceeds a threshold distance, the computing device may determine that the first employee is unlikely to arrive at the place of business of the employer in time for the start of the first shift. For example, depending on the geographic location of the employer's place of business, speed limits of the surrounding roads, current traffic conditions of the surrounding roads, and so forth, the computing device may determine an amount of time that the employee will likely require to travel from the employee's current location to the employer's place of business. The computing device may compare this amount time with the amount of time until the shift start time to determine whether the employee will be able to arrive on time.

At 810, the computing device may send a first communication to the first mobile device. For example, the computing device may send an inquiry to the first mobile device to inquire whether the employee will be coming to work for the start of the shift.

At 812, the computing device determines whether a reply is received in response to the first communication.

At 814, if a reply to the first communication is received, the computing device may determine whether the employee is still coming in and, thus, will be arriving late.

At 816, if the reply indicates that the employee is still planning to come in and will be arriving late the computing device may estimate the employee's arrival time based at least in part on the current location of the employee. For example, using the techniques discussed above, the computing device may determine the estimated arrival time based on distance, current traffic conditions, speed limits, and the like.

At 818, if the employee will be late by more than a threshold amount of time, the computing device may send a second communication seeking a replacement employee for a portion of the shift. For example, if the employee will be arriving late, the computing device may send a communication to a mobile device of an employee whose shift will be ending close to the start of the shift of the first employee, to determine whether the other employee can fill in until the first employee arrives. Alternatively, depending on how late the first employee will be, if another employee is on call, the computing device may send a communication to the on-call employee to request that the on-call employee fill in until the first employee arrives. Furthermore, the communication may include an indication of an estimated time at which the first employee is estimated to arrive at the place of business. The estimated time may be based at least in part on the indicated location of the first mobile device, as discussed above.

At 820, if no reply is received from the first employee at 812, or if the first employee has indicated at 814 that he or she will not be coming in, the computing device may send a communication seeking a replacement employee for the entire shift. Thus, the computing device may send a communication to a second mobile device, associated with a second employee that is indicated to be at the place of business. For example, the second employee may be determined, based at least in part on the shift schedule, to be completing a second shift of the plurality of shifts prior to or during the first shift. Additionally, or alternatively, the computing device may send a communication to a third mobile device associated with a third employee that is indicated to be within a threshold distance of the place of business. For instance, the shift schedule may indicate that the third employee is on call or is otherwise available to fill in for the first employee. In addition, the communication may include an offer of an incentive for the second employee or the third employee to accept working the first shift. For instance, the incentive may be additional pay in addition to an established wage of the second employee or the third employee.

FIG. 9 is a flow diagram illustrating an example process 900 for shift management according to some implementations. In some examples, the process may be executed by the service computing device of the service provider, or by one or more other suitable computing devices.

At 902, the computing device may receive transaction information from a point of sale (POS) device of a merchant at a POS location. For example, the merchant may be an employer that employs a plurality of employees, and the service provider may manage the shift scheduling for the employer. The service provider may provide a payment processing service and may thereby receive transaction information from the merchant/employer.

At 904, the computing device may compare the transaction information with one or more thresholds. For example, with respect to understaffing, the computing device may determine that a total number of transactions at the POS location over a period of time exceed a transaction threshold, or that a frequency of the transactions over the period of time has increased by a rate that exceeds a rate threshold. Similarly, with respect to overstaffing, the computing device may determine that a total number of transactions at the POS location over the period of time is below a transaction threshold, or that a frequency of the transactions over the period of time has decreased by a rate that exceeds a rate threshold.

At 906, based on the comparison of the transaction information with the one or more thresholds, the computing device may determine whether the employer is currently overstaffed or understaffed at the POS location. The one or more thresholds may be determined, at least in part, based on transaction information received from a large number of similar merchants.

At 908, if the computing device determines that the employer is currently understaffed, the computing device may determine an employee that is on call or not currently scheduled to be working at the POS location of the employer. The computing device may further determine if the employee is authorized by the employer to perform the employee position corresponding to the first shift.

At 910, the computing device may determine whether the employee is within a threshold distance of the POS location. If not, the computing device may return to block 908 to determine another employee.

At 912, if the employee is within a threshold distance of the POS location, the computing device may send a communication to a mobile device of the employee to request that the employee come in to work at the POS location.

At 914, on the other hand if the computing device determines that the POS location is currently overstaffed, the computing device may determine an employee position that is likely to be overstaffed, such as based on scheduling information received from a large number of similar merchants. In addition, the computing device may access employee profiles of the employees scheduled to work during the current shift, and may select an employee to which to send a communication based at least in part on a comparison of employee performance ratings of respective employees scheduled to work for the employee position during the current shift. As mentioned above, the employee performance ratings may be determined based on at least one of an amount of gratuities received by the respective employees over time: information received from customers related to the respective employees: or employee histories indicating, for the respective employees, employee performance at prior jobs, shift profitability, and so forth.

At 916, the computing device may send a communication to a mobile device of a selected employee corresponding to the employee position. For example, the communication may offer an incentive for the employee to leave work early.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
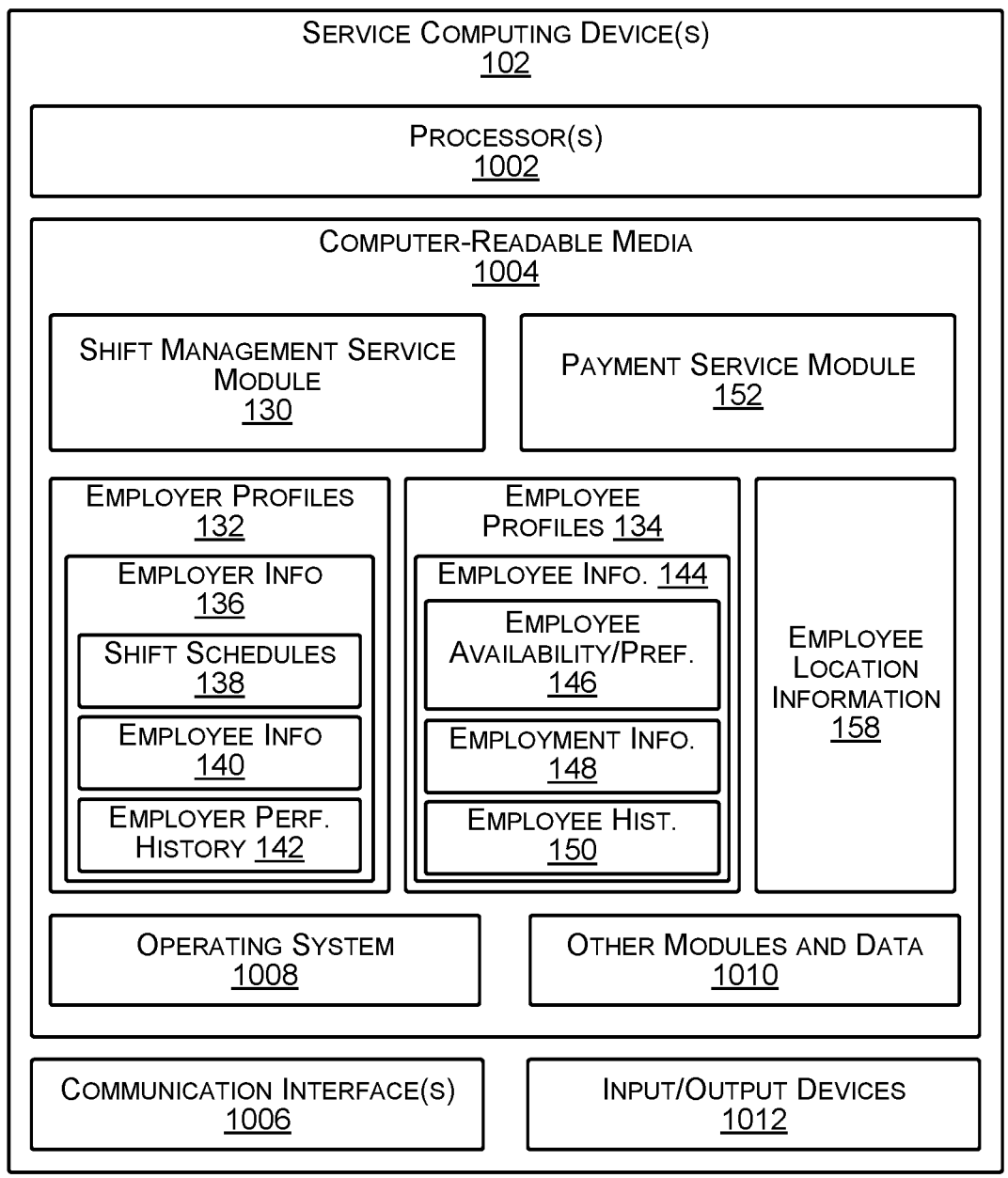
FIG. 10 illustrates select components of an example service computing device according to some implementations.

FIG. 10 illustrates select components of the service computing device 102 that may be used to implement some functionality of the shift management service described herein. The service computing device 102 may be maintained and/or operated by the service provider that provides the shift management and payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 1002, one or more computer-readable media 1004, and one or more communication interfaces 1006. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or otherwise configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1004 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure or otherwise program the one or more processors 1002 to perform the actions attributed above to the service computing device 102. Functional components stored in the computer-readable media 1004 may include the shift management service module 130, as described above, which may be executed to provide the shift management service, and the payment service module 152, which may provide the payment service discussed above. Additional functional components stored in the computer-readable media 1004 may include an operating system 1008 for controlling and managing various functions of the service computing device(s) 102.

In addition, the computer-readable media 1004 may store data used for performing the operations described herein. Thus, the computer-readable media may store the employer profiles 132 and the employee profiles 134. As discussed above, the employer profiles 132 may include employer information 136, including shift schedules 138, employee information 140, and employer performance history 142. The employee profiles 134 may include employee information 144, including employee availability and preferences 146, employment information 148, and employee history 150. Further, the computer-readable media 1004 may store, in association with the employee profiles 134, employee location information 158 for particular employees who opted into location tracking. The service computing device 102 may also include or maintain other functional components and data, such as other modules and data 1010, which may include programs, drivers, etc., and the data used or generated by the functional components. Further, the service computing device 102 may include many other logical, programmatic and physical components, of which those described above are merely examples that are related to the discussion herein.

The communication interface(s) 1006 may include one or more interfaces and hardware components for enabling communication with various other devices, such as over the network(s) 106. For example, communication interface(s) 1006 may enable communication through one or more of the Internet, cable networks, cellular networks, wireless networks (e.g., Wi-Fi) and wired networks, as well as close-range communications, and the like, as additionally enumerated elsewhere herein.

The service computing device 102 may further be equipped with various input/output (I/O) devices 1012. Such I/O devices 1012 may include a display, various user interface controls (e.g., buttons, joystick, keyboard, mouse, touch screen, etc.), audio speakers, connection ports, and so forth.

Figure 11:
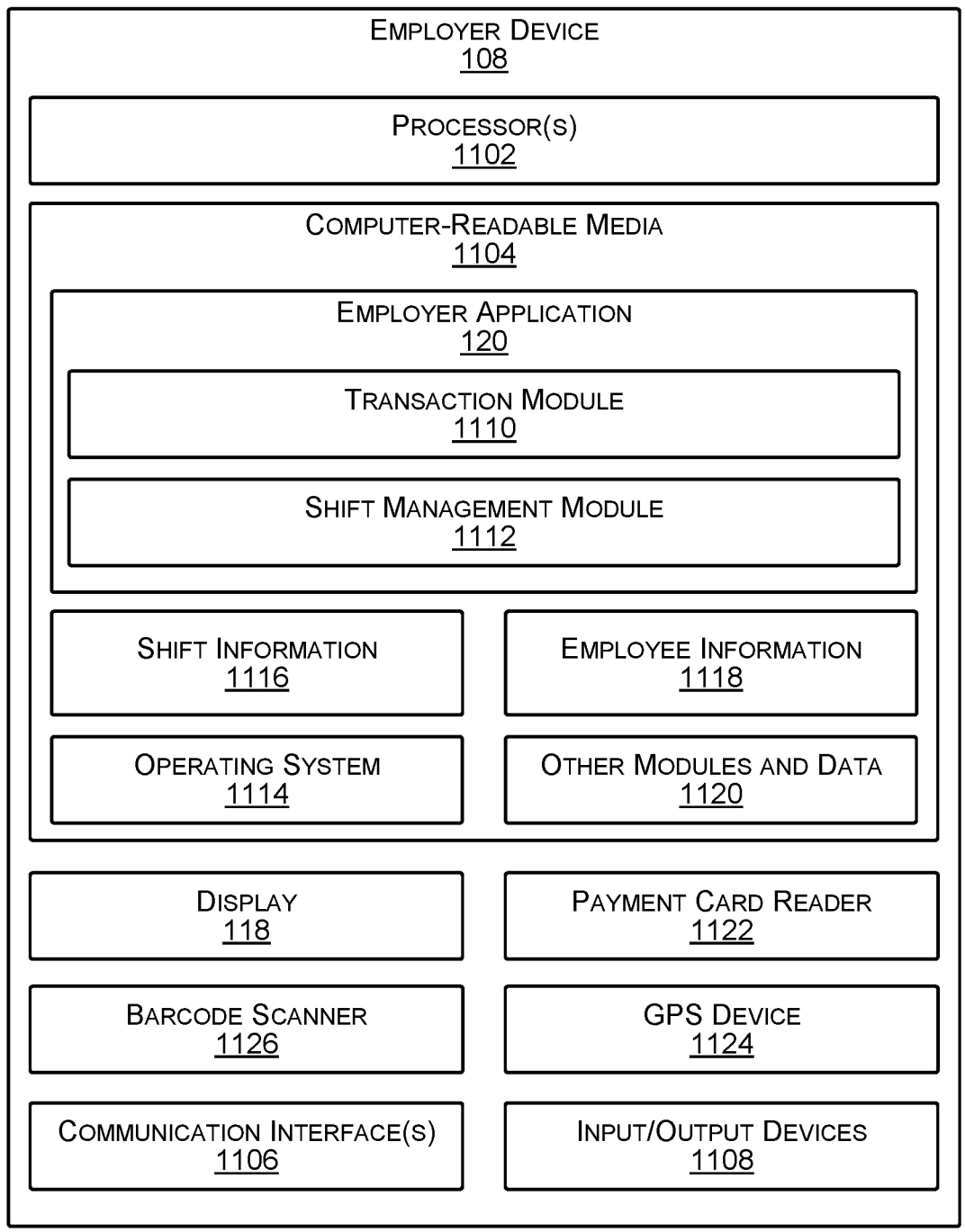
FIG. 11 illustrates select components of an example employer device according to some implementations.

FIG. 11 illustrates select example components of an example employer device 108 according to some implementations. The employer device 108 may be any suitable type of computing device, e.g., portable, semi-portable, semi-stationary, or stationary. Some examples of the employer device 108 may include tablet computing devices: smart phones and mobile communication devices: laptops, netbooks and other portable computers or semi-portable computers: desktop computing devices, terminal computing devices and other semi-stationary or stationary computing devices: dedicated register devices: wearable computing devices, or other body-mounted computing devices: augmented reality devices; or other computing devices capable of sending communications and performing the functions according to the techniques described herein.

In the illustrated example, the employer device 108 includes at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or otherwise configured to execute the algorithms and processes described herein. The processor 1102 can be configured to fetch and execute computer-readable processor-executable instructions stored in the computer-readable media 1104.

Depending on the configuration of the employer device 108, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the employer device 108 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the employer device 108. Functional components of the employer device 108 stored in the computer-readable media 1104 may include the employer application 120. In this example, the employer application 120 includes a transaction module 1110 and a shift management module 1112. For example, the transaction module 1110 may present an interface, such as a payment GUI, to enable the employer/merchant to conduct transactions, process payments, and so forth. In addition, the transaction module 1110 may communicate with the service computing device 102 for processing payments and sending transaction information. Further, the shift management module 1112 may present one or more GUIs to enable the employer and the employees to manage shift assignments, as discussed above. The dashboard module 1112 may further enable the employer to manage the employer's profile, employee information, and the like. Additional functional components may include an operating system 1114 for controlling and managing various functions of the employer device 108 and for enabling basic user interactions with the employer device 108.

In addition, the computer-readable media 1104 may also store data, data structures, and the like, that are used by the functional components. For example, data stored by the computer-readable media 1104 may include shift information 1116 that may include a shift template, shift scheduling history, and so forth. Furthermore, the computer-readable media may also include employee information 1118, which may include information about the employees of the employer, including authorized employee positions for each employee, wages paid each employee, and the like. Depending on the type of the employer device 108, the computer-readable media 1104 may also optionally include other functional components and data, such as other modules and data 1120, which may include programs, drivers, etc., and the data used or generated by the functional components. Further, the employer device 108 may include many other logical, programmatic and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 11 further illustrates that the employer device 108 may include the display 118. Depending on the type of computing device used as the employer device 108, the display 118 may employ any suitable display technology. For example, the display 118 may be a liquid crystal display, a plasma display, a light emitting diode display, an OLED (organic light-emitting diode) display, an electronic paper display, or any other suitable type of display able to present digital content thereon. In some examples, the display 118 may have a touch sensor associated with the display 118 to provide a touchscreen display configured to receive touch inputs for enabling interaction with a GUI presented on the display 118. Accordingly, implementations herein are not limited to any particular display technology. Alternatively, in some examples, the employer device 108 may not include the display 118, and information may be presented by other means, such as aurally.

The employer device 108 may further include the one or more I/O devices 1108. The I/O devices 1108 may include speakers, a microphone, a camera, and various user controls (e.g., buttons, a joystick, a keyboard, a keypad, etc.), a haptic output device, and so forth.

In addition, the employer device 108 may include or may be connectable to a payment card reader 1122. In some examples, the card reader 1122 may plug in to a port in the employer device 108, such as a microphone/headphone port, a data port, or other suitable port. The card reader 1122 may include a read head for reading a magnetic strip of a payment card, and further may include encryption technology for encrypting the information read from the magnetic strip. Alternatively, numerous other types of card readers may be employed with the employer device 108 herein, depending on the type and configuration of the employer device 108.

Other components included in the employer device 108 may include various types of sensors, which may include a GPS device 1124 able to indicate location information, as well as other sensors (not shown) such as an accelerometer, gyroscope, compass, proximity sensor, and the like. Further, the employer device 108 may include a barcode scanner 1126 to enable employees to scan barcodes associated with certain items when using the employer device as a POS device for processing POS transactions. Additionally, the employer device 108 may include various other components that are not shown, examples of which include removable storage, a power source, such as a battery and power control unit, and so forth.

Figure 12:
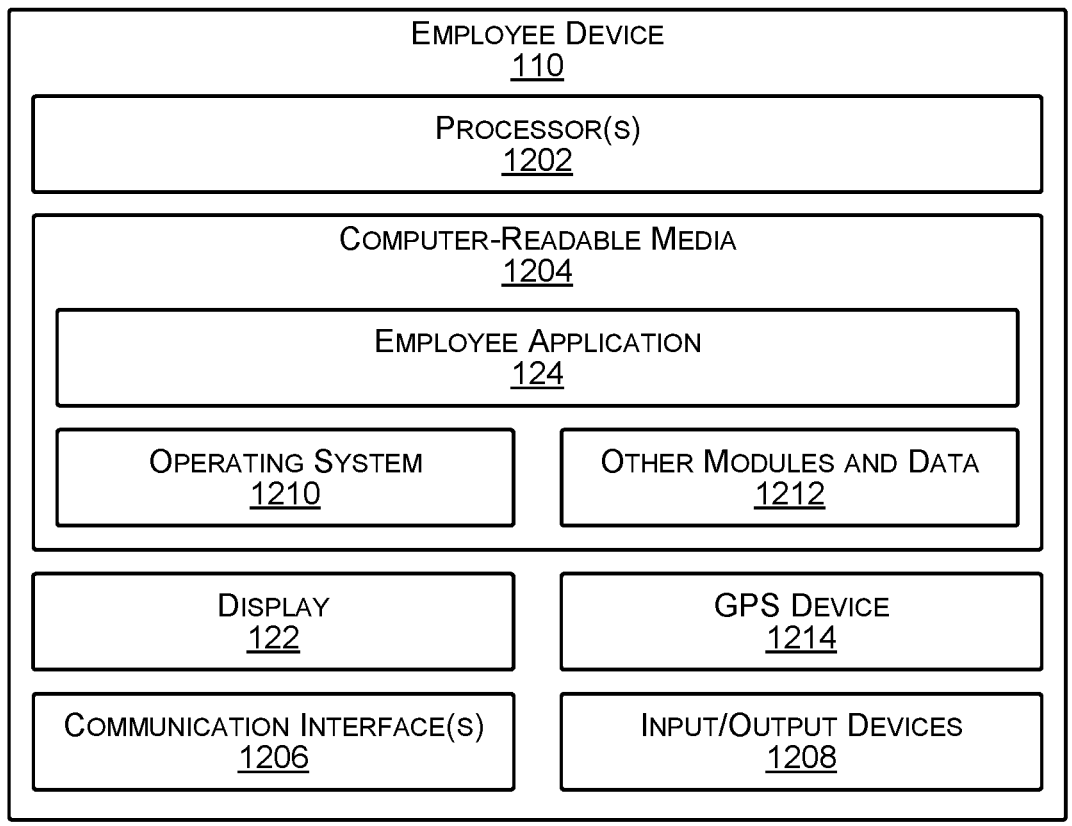
FIG. 12 illustrates select components of an example employee device according to some implementations.

FIG. 12 illustrates select example components of the employee device 110 that may implement the functionality described above according to some examples. As mentioned above, the employee device 110 may be any of a number of different types of computing devices. Some examples of the employee device 110 may include smart phones and mobile communication devices; tablet computing devices: laptop computers, netbooks and other portable computers: wearable computing devices and/or body-mounted computing devices, which may include watches, wrist bands, and augmented reality devices, such as helmets, goggles or glasses; and any other mobile device capable of sending communications and performing the functions according to the techniques described herein. Additionally, in other examples, the employee device may include stationary and semi-stationary computing devices, such as laptop computers, desktop computers, terminals, workstations, or the like.

In the example of FIG. 12, the employee device 110 includes components such as at least one processor 1202, one or more computer-readable media 1204, the one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or otherwise configured to execute the algorithms and processes described herein. The processor 1202 can be configured to fetch and execute computer-readable processor-executable instructions stored in the computer-readable media 1204.

Depending on the configuration of the employee device 110, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the employee device 110 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the employee device 110. Functional components of the employee device 110 stored on the computer-readable media 1204 may include the employee application 124, as discussed above. In some examples, the employee application 124 may include a browser or other application able to access websites, ecommerce sites or other online sites maintained by the service provider. In some cases, the employee application 124 may present the employee with one or more GUIs, such as for viewing and setting employee availability and shift preferences, viewing shift schedules, and/or bidding on open shifts. Additional functional components may include an operating system 1210 for controlling and managing various functions of the employee device 110 and for enabling basic user interactions with the employee device 110.

In addition, the computer-readable media 1204 may also store data, data structures and the like, that are used by the functional components. Depending on the type of the employee device 110, the computer-readable media 1204 may also optionally include other functional components and data, such as other modules and data 1212, which may include applications, programs, drivers, etc., and the data used or generated by the functional components. Further, the employee device 110 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 12 further illustrates that the employee device 110 may include the display 122, mentioned above. Depending on the type of computing device used as the employee device 110, the display 122 may employ any suitable display technology. For example, the display 122 may be a liquid crystal display, a plasma display, a light emitting diode display, an OLED (organic light-emitting diode) display, an electronic paper display, or any other suitable type of display able to present digital content thereon. In some examples, the display 122 may have a touch sensor associated with the display 122 to provide a touchscreen display configured to receive touch inputs for enabling interaction with a GUI presented on the display 122. Accordingly, implementations herein are not limited to any particular display technology. Alternatively, in some examples, the employee device 110 may not include a display.

The employee device 110 may further include the one or more I/O devices 1208. The I/O devices 1208 may include speakers, a microphone, a camera, and various user controls (e.g., buttons, a joystick, a keyboard, a keypad, etc.), a haptic output device, and so forth.

Other components included in the employee device 110 may include various types of sensors (not shown), which may include a GPS (Global Positioning System) device 1214 able to indicate location information, as well as other sensors such as an accelerometer, gyroscope, compass, proximity sensor, and the like. Additionally, the employee device 110 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
non-transitory computer-readable media storing instructions that, when executed by the one or more processors, cause the one or more processors to perform operations comprising:
receiving, by a server of a service provider and from a merchant device, transaction data representing one or more transactions associated with a merchant having an account with a payment service system, wherein the merchant device has installed thereon an instance of a merchant application configuring the merchant device as a point-of-sale terminal for generating the transaction data and transmitting the transaction data to the service provider;
maintaining, by the server of the service provider, resource data indicating (a) employee profiles that are available to be assigned to one or more shifts, wherein the employee profiles are associated with respective employees of the merchant, and (b) a shift schedule that indicates employee assignments for individual shifts of the one or more shifts;
receiving, by the server of the service provider, additional transaction data representing a plurality of additional transactions associated with a plurality of additional merchant devices associated with a plurality of different merchants having accounts with the payment service system;
determining, by the server of the service provider, a staffing threshold associated with the merchant based at least in part on the additional transaction data, wherein the plurality of different merchants share a characteristic with the merchant;
determining, automatically and by the server of the service provider, graphical user interface (GUI) elements to be displayed in a shift scheduling template based at least in part on the staffing threshold, the transaction data, and the additional transaction data;
generating, automatically and by the server of the service provider, the GUI elements such that the GUI elements are configured to be displayed in the shift schedule and are selectable to provide virtual controls to alter the shift schedule, the GUI elements including indications of employee positions and assigned shifts;
sending, by the server of the service provider and to the merchant application, data representing the GUI elements, the data causing the merchant application to render the GUI elements in the shift scheduling template; and
sending, by the server of the service provider, second data representing at least a portion of the GUI elements to employee applications executing on one or more devices associated with the respective employees, the second data causing the employee applications to render at least the portion of the GUI elements in the shift scheduling template.

2. The system of claim 1, the operations further comprising determining the shift scheduling template to associate with the merchant based at least in part on a merchant type of the merchant.

3. The system of claim 1, wherein the GUI elements include:
first GUI elements associated with shift positions associated with the shift schedule; and
second GUI elements associated with respective times of the one or more shifts.

4. The system of claim 1, the operations further comprising:
determining, based at least in part on the staffing threshold, a portion of the one or more shifts where a shift position is to be unfilled, wherein a portion of the GUI elements are configured to indicate that the shift position is to be unfilled; and
causing the merchant device to render the portion of the GUI elements such that the shift position is indicated to be unfilled.

5. The system of claim 1, the operations further comprising generating the shift scheduling template based at least in part on characteristics of the plurality of different merchants.

6. The system of claim 1, the operations further comprising:
determining a merchant category associated with the merchant;
determining a subset of the plurality of different merchants that are associated with the merchant category;
determining a portion of the subset of the plurality of different merchants that are associated with at least one of:
a number of employees that corresponds to the merchant;
a revenue that corresponds to the merchant; or a number of customs that corresponds to the merchant; and generating the shift scheduling template based at least in part on shift scheduling templates associated with the portion of the subset of the plurality of different merchants.

7. The system of claim 1, the operations further comprising:
determining a geolocation of the merchant;
determining a subset of the plurality of different merchants that are within a threshold distance of the geolocation of the merchant; and
generating the shift scheduling template based at least in part on shift scheduling templates associated with the subset of the plurality of different merchants.

8. The system of claim 1, the operations further comprising:
receiving updated transaction data indicating changes to the staffing threshold;
generating updated GUI elements based at least in part on the updated transaction data; and
automatically causing rendering of the updated GUI elements on the merchant device such that the updated GUI elements replace the GUI elements.

9. The system of claim 1, the operations further comprising automatically assigning, based at least in part on the resource data, the employee profiles to individual ones of the one or more shifts, wherein generating the GUI elements includes generating the GUI elements such that a portion of the GUI elements indicate which of the employee profiles have been assigned to the one or more shifts.

10. The system of claim 1, the operations further comprising determining day splits to associate with days of a week for the merchant based at least in part on the staffing threshold, wherein generating the GUI elements is based at least in part on the day splits.

11. A method implemented by a server of a service provider, the method comprising:
receiving, from a merchant device, transaction data representing one or more transactions associated with a merchant, wherein the merchant device has installed thereon an instance of a merchant application configuring the merchant device as a point-of-sale terminal;
receiving additional transaction data representing a plurality of additional transactions associated with a plurality of additional merchant devices associated with a plurality of different merchants having accounts with the service provider;
storing resource data indicating (a) employee profiles that are available to be assigned to one or more shifts, and (b) a shift schedule that indicates employee assignments for individual shifts of the one or more shifts;
determining a staffing threshold associated with the merchant based at least in part on the additional transaction data;
automatically determining graphical user interface (GUI) elements to be displayed in a shift scheduling template based at least in part on the staffing threshold the transaction data, and the additional transaction data;
automatically generating the GUI elements such that the GUI elements are configured to be displayed in the shift schedule and are selectable to alter the shift schedule;
automatically sending data representing the GUI elements to the merchant device, the data causing the merchant application to render the GUI elements in the shift scheduling template; and
sending second data representing a portion of the GUI elements to user devices associated with employees of the merchant, the second data causing employee applications executing on the user devices to render the portion of the GUI elements in the shift scheduling template.

12. The method of claim 11, further comprising determining the shift scheduling template to associate with the merchant based at least in part on a merchant category of the merchant.

13. The method of claim 11, wherein the GUI elements include:
first GUI elements associated with shift positions;
second GUI elements associated with respective times of the one or more shifts for the shift positions; and
third GUI elements associated with days of a week.

14. The method of claim 11, further comprising:
determining a portion of the one or more shifts where a shift position is to be unassigned, wherein a portion of the GUI elements are configured to indicate that the shift position is to be unassigned; and
causing the merchant device to render the portion of the GUI elements such that the shift position is indicated to be unassigned.

15. The method of claim 11, further comprising generating the shift scheduling template based at least in part on shift scheduling templates of the plurality of different merchants and similarities between the transaction data and the additional transaction data.

16. The method of claim 11, further comprising:
determining a subset of the plurality of different merchants that are associated with a merchant category of the merchant;
determining a portion of the subset of the plurality of different merchants that are associated with a transaction-related characteristic of the merchant; and
generating the shift scheduling template based at least in part on shift scheduling templates associated with the portion of the subset of the plurality of different merchants.

17. The method of claim 11, further comprising:
determining a subset of the plurality of different merchants that are associated with a merchant category of the merchant;
determining a portion of the subset of the plurality of different merchants that are associated with a location-related characteristic of the merchant; and
generating the shift scheduling template based at least in part on shift scheduling templates associated with the portion of the subset of the plurality of different merchants.

18. The method of claim 11, further comprising:
receiving updated transaction data indicating changes to staffing needs of the merchant;
generating updated GUI elements based at least in part on the updated transaction data; and
automatically causing rendering of the updated GUI elements on the merchant device such that the updated GUI elements replace the GUI elements.

19. The method of claim 11, further comprising generating a preliminary assignment of the employee profiles to individual ones of the one or more shifts, wherein generating the GUI elements includes generating the GUI elements such that a portion of the GUI elements indicate which of the employee profiles have been preliminarily assigned to the one or more shifts.

20. The method of claim 11, further comprising determining calendar divisions to associate with the merchant based at least in part on the staffing threshold, wherein generating the GUI elements is based at least in part on the calendar divisions.

\* \* \* \* \*